United States Patent
Olivier et al.

(10) Patent No.: US 12,081,616 B2
(45) Date of Patent: Sep. 3, 2024

(54) SYSTEM AND METHOD FOR SIGNALING THROUGH DATA STORAGE

(71) Applicant: Twilio Inc., San Francisco, CA (US)

(72) Inventors: Carl Olivier, London (GB); Sergei Zolotarjov, Tallinn (EE); Mihails Velenko, Tallinn (EE); Devid Liik, Tallinn (EE); Artyom Tyazhelov, Tallinn (EE)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/649,108

(22) Filed: Jan. 27, 2022

(65) Prior Publication Data

US 2022/0150299 A1 May 12, 2022

Related U.S. Application Data

(63) Continuation of application No. 16/730,626, filed on Dec. 30, 2019, now Pat. No. 11,265,367, which is a
(Continued)

(51) Int. Cl.
G06F 9/44 (2018.01)
H04L 67/10 (2022.01)
H04L 67/1095 (2022.01)

(52) U.S. Cl.
CPC .......... *H04L 67/10* (2013.01); *H04L 67/1095* (2013.01)

(58) Field of Classification Search
None
See application file for complete search history.

(56) References Cited

U.S. PATENT DOCUMENTS

| 5,274,700 A | 12/1993 | Gechter et al. |
| 5,526,416 A | 6/1996 | Dezonno et al. |

(Continued)

FOREIGN PATENT DOCUMENTS

| DE | 1684587 A1 | 3/1971 |
| EP | 0282126 A2 | 9/1988 |

(Continued)

OTHER PUBLICATIONS

Tom Boyd et al., "Process Migration: A Generalized Approach Using a Virtualizing Operating System", 2002 (Year: 2002).*
(Continued)

*Primary Examiner* — Wei Y Zhen
*Assistant Examiner* — Lanny N Ung
(74) *Attorney, Agent, or Firm* — Schwegman Lundberg & Woessner, P.A.

(57) ABSTRACT

An application platform system and method. A data synchronization instance manages a reference state object for a data synchronization system (DSS) account. A first local state object is stored at a first application system. The first application system receives update notifications provided by the DSS. A second local state object is stored at a second application system. The second application system receives update notifications provided by the DSS. An application instruction of the first application system is transformed into a state update, and the first local state object is modified to include the state update. The state update is provided to the DSS via a local update notification. The reference state object is modified to include the state update. The state update is provided to the second application system via a reference update notification. The second local state object is modified to include the state update.

20 Claims, 13 Drawing Sheets

Related U.S. Application Data continuation of application No. 15/914,401, filed on Mar. 7, 2018, now Pat. No. 10,560,516, which is a continuation of application No. 15/154,700, filed on May 13, 2016, now Pat. No. 9,948,703.

(60) Provisional application No. 62/265,557, filed on Dec. 10, 2015, provisional application No. 62/163,270, filed on May 18, 2015, provisional application No. 62/161,724, filed on May 14, 2015, provisional application No. 62/161,719, filed on May 14, 2015.

(56) References Cited

U.S. PATENT DOCUMENTS

| | | | |
|---|---|---|---|
| 5,581,608 A | 12/1996 | Jreij et al. | |
| 5,598,457 A | 1/1997 | Foladare et al. | |
| 5,867,495 A | 2/1999 | Elliott et al. | |
| 5,934,181 A | 8/1999 | Adamczewski | |
| 5,978,465 A | 11/1999 | Corduroy et al. | |
| 6,026,440 A | 2/2000 | Shrader et al. | |
| 6,034,946 A | 3/2000 | Roginsky et al. | |
| 6,094,681 A | 7/2000 | Shaffer et al. | |
| 6,138,143 A | 10/2000 | Gigliotti et al. | |
| 6,185,565 B1 | 2/2001 | Meubus et al. | |
| 6,192,123 B1 | 2/2001 | Grunsted et al. | |
| 6,206,564 B1 | 3/2001 | Adamczewski | |
| 6,223,287 B1 | 4/2001 | Douglas et al. | |
| 6,232,979 B1 | 5/2001 | Shochet | |
| 6,269,336 B1 | 7/2001 | Ladd et al. | |
| 6,317,137 B1 | 11/2001 | Rosasco | |
| 6,324,587 B1 * | 11/2001 | Trenbeath | H04L 67/1095 719/310 |
| 6,363,065 B1 | 3/2002 | Thornton et al. | |
| 6,373,836 B1 | 4/2002 | Deryugin et al. | |
| 6,425,012 B1 | 7/2002 | Trovato et al. | |
| 6,426,995 B1 | 7/2002 | Kim et al. | |
| 6,430,175 B1 | 8/2002 | Echols et al. | |
| 6,434,528 B1 | 8/2002 | Sanders | |
| 6,445,694 B1 | 9/2002 | Swartz | |
| 6,445,776 B1 | 9/2002 | Shank et al. | |
| 6,459,913 B2 | 10/2002 | Cloutier | |
| 6,463,414 B1 | 10/2002 | Su et al. | |
| 6,493,558 B1 | 12/2002 | Bernhart et al. | |
| 6,496,500 B2 | 12/2002 | Nance et al. | |
| 6,501,739 B1 | 12/2002 | Cohen | |
| 6,501,832 B1 | 12/2002 | Saylor et al. | |
| 6,507,875 B1 | 1/2003 | Mellen-Garnett et al. | |
| 6,571,245 B2 | 5/2003 | Huang et al. | |
| 6,574,216 B1 | 6/2003 | Farris et al. | |
| 6,577,721 B1 | 6/2003 | Vainio et al. | |
| 6,600,736 B1 | 7/2003 | Ball et al. | |
| 6,606,596 B1 | 8/2003 | Zirngibl et al. | |
| 6,614,783 B1 | 9/2003 | Sonesh et al. | |
| 6,625,258 B1 | 9/2003 | Ram et al. | |
| 6,625,576 B2 | 9/2003 | Kochanski et al. | |
| 6,636,504 B1 | 10/2003 | Albers et al. | |
| 6,662,231 B1 | 12/2003 | Drosset et al. | |
| 6,704,785 B1 | 3/2004 | Koo et al. | |
| 6,707,889 B1 | 3/2004 | Saylor et al. | |
| 6,711,129 B1 | 3/2004 | Bauer et al. | |
| 6,711,249 B2 | 3/2004 | Weissman et al. | |
| 6,738,738 B2 | 5/2004 | Henton | |
| 6,757,365 B1 | 6/2004 | Bogard | |
| 6,765,997 B1 | 7/2004 | Zirngibl et al. | |
| 6,768,788 B1 | 7/2004 | Langseth et al. | |
| 6,771,955 B2 | 8/2004 | Imura et al. | |
| 6,778,653 B1 | 8/2004 | Kallas et al. | |
| 6,785,266 B2 | 8/2004 | Swartz | |
| 6,788,768 B1 | 9/2004 | Saylor et al. | |
| 6,792,086 B1 | 9/2004 | Saylor et al. | |
| 6,792,093 B2 | 9/2004 | Barak et al. | |
| 6,798,867 B1 | 9/2004 | Zirngibl et al. | |
| 6,807,529 B2 | 10/2004 | Johnson et al. | |
| 6,807,574 B1 | 10/2004 | Partovi et al. | |
| 6,819,667 B1 | 11/2004 | Brusilovsky et al. | |
| 6,820,260 B1 | 11/2004 | Flockhart et al. | |
| 6,829,334 B1 | 12/2004 | Zirngibl et al. | |
| 6,831,966 B1 | 12/2004 | Tegan et al. | |
| 6,834,265 B2 | 12/2004 | Balasuriya | |
| 6,836,537 B1 | 12/2004 | Zirngibl et al. | |
| 6,842,767 B1 | 1/2005 | Partovi et al. | |
| 6,850,603 B1 | 2/2005 | Eberle et al. | |
| 6,870,830 B1 | 3/2005 | Schuster et al. | |
| 6,873,952 B1 | 3/2005 | Bailey et al. | |
| 6,874,084 B1 | 3/2005 | Dobner et al. | |
| 6,885,737 B1 | 4/2005 | Gao et al. | |
| 6,888,929 B1 | 5/2005 | Saylor et al. | |
| 6,895,084 B1 | 5/2005 | Saylor et al. | |
| 6,898,567 B2 | 5/2005 | Balasuriya | |
| 6,912,581 B2 | 6/2005 | Johnson et al. | |
| 6,922,411 B1 | 7/2005 | Taylor | |
| 6,928,469 B1 | 8/2005 | Duursma et al. | |
| 6,931,405 B2 | 8/2005 | El-shimi et al. | |
| 6,937,699 B1 | 8/2005 | Schuster et al. | |
| 6,940,953 B1 | 9/2005 | Eberle et al. | |
| 6,941,268 B2 | 9/2005 | Porter et al. | |
| 6,947,417 B2 | 9/2005 | Laursen et al. | |
| 6,947,988 B1 | 9/2005 | Saleh et al. | |
| 6,961,330 B1 | 11/2005 | Cattan et al. | |
| 6,964,012 B1 | 11/2005 | Zirngibl et al. | |
| 6,970,915 B1 | 11/2005 | Partovi et al. | |
| 6,977,992 B2 | 12/2005 | Zirngibl et al. | |
| 6,981,041 B2 | 12/2005 | Araujo et al. | |
| 6,985,862 B2 | 1/2006 | Strom et al. | |
| 6,999,576 B2 | 2/2006 | Sacra | |
| 7,003,464 B2 | 2/2006 | Ferrans et al. | |
| 7,006,606 B1 | 2/2006 | Cohen et al. | |
| 7,010,586 B1 | 3/2006 | Allavarpu et al. | |
| 7,020,685 B1 | 3/2006 | Chen et al. | |
| 7,039,165 B1 | 5/2006 | Saylor et al. | |
| 7,058,042 B2 | 6/2006 | Bontempi et al. | |
| 7,058,181 B2 | 6/2006 | Wright et al. | |
| 7,062,709 B2 | 6/2006 | Cheung | |
| 7,065,637 B1 | 6/2006 | Nanja | |
| 7,076,037 B1 | 7/2006 | Gonen et al. | |
| 7,076,428 B2 | 7/2006 | Anastasakos et al. | |
| 7,089,310 B1 | 8/2006 | Ellerman et al. | |
| 7,099,442 B2 | 8/2006 | Da Palma et al. | |
| 7,103,003 B2 | 9/2006 | Brueckheimer et al. | |
| 7,103,171 B1 | 9/2006 | Annadata et al. | |
| 7,106,844 B1 | 9/2006 | Holland | |
| 7,111,163 B1 | 9/2006 | Haney | |
| 7,136,932 B1 | 11/2006 | Schneider | |
| 7,140,004 B1 | 11/2006 | Kunins et al. | |
| 7,143,039 B1 | 11/2006 | Stifelman et al. | |
| 7,197,331 B2 | 3/2007 | Anastasakos et al. | |
| 7,197,461 B1 | 3/2007 | Eberle et al. | |
| 7,197,462 B2 | 3/2007 | Takagi et al. | |
| 7,197,544 B2 | 3/2007 | Wang et al. | |
| D540,074 S | 4/2007 | Peters | |
| 7,225,232 B2 | 5/2007 | Elberse | |
| 7,227,849 B1 | 6/2007 | Rasanen | |
| 7,245,611 B2 | 7/2007 | Narasimhan et al. | |
| 7,260,208 B2 | 8/2007 | Cavalcanti | |
| 7,266,181 B1 | 9/2007 | Zirngibl et al. | |
| 7,269,557 B1 | 9/2007 | Bailey et al. | |
| 7,272,212 B2 | 9/2007 | Eberle et al. | |
| 7,272,564 B2 | 9/2007 | Phillips et al. | |
| 7,277,851 B1 | 10/2007 | Henton | |
| 7,283,515 B2 | 10/2007 | Fowler | |
| 7,283,519 B2 | 10/2007 | Girard | |
| 7,286,521 B1 | 10/2007 | Jackson et al. | |
| 7,287,248 B1 | 10/2007 | Adeeb | |
| 7,289,453 B2 | 10/2007 | Riedel et al. | |
| 7,296,739 B1 | 11/2007 | Mo et al. | |
| 7,298,732 B2 | 11/2007 | Cho | |
| 7,298,834 B1 | 11/2007 | Homeier et al. | |
| 7,308,085 B2 | 12/2007 | Weissman | |
| 7,308,408 B1 | 12/2007 | Stifelman et al. | |
| 7,324,633 B2 | 1/2008 | Gao et al. | |
| 7,324,942 B1 | 1/2008 | Mahowald et al. | |
| 7,328,263 B1 | 2/2008 | Sadjadi | |
| 7,330,463 B1 | 2/2008 | Bradd et al. | |

(56) References Cited

U.S. PATENT DOCUMENTS

| | | |
|---|---|---|
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |

(56) References Cited

U.S. PATENT DOCUMENTS

| | | |
|---|---|---|
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,231,894 B1 | 1/2016 | Dietz et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,948,703 B2 | 4/2018 | Olivier et al. |
| 11,265,367 B2 | 3/2022 | Olivier et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0083098 A1* | 6/2002 | Nakamura ............ G06F 16/954 715/234 |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0167333 A1 | 9/2003 | Kumar et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |

(56) References Cited

U.S. PATENT DOCUMENTS

| | | |
|---|---|---|
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0282125 A1* | 11/2009 | Jeide .......... H04L 67/1095 709/217 |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |

(56) References Cited

U.S. PATENT DOCUMENTS

| | | |
|---|---|---|
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0302479 A1 | 12/2011 | Movida et al. |
| 2011/0310902 A1 | 12/2011 | Xu |
| 2011/0313950 A1 | 12/2011 | Nuggehalli et al. |
| 2011/0320407 A1* | 12/2011 | Augustine ............ G06F 16/2315 707/E17.005 |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254108 A1 | 10/2012 | Wedewer et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2012/0330887 A1* | 12/2012 | Young ................... G06F 16/275 707/610 |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0093219 A1* | 4/2014 | Trivedi ............ H04N 21/43076 386/201 |
| 2014/0095624 A1 | 4/2014 | Quan |
| 2014/0095625 A1 | 4/2014 | Quan et al. |
| 2014/0095627 A1 | 4/2014 | Romagnino |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0241354 A1* | 8/2014 | Shuman ............... H04L 12/2803 370/390 |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |

(56) References Cited

U.S. PATENT DOCUMENTS

| | | | |
|---|---|---|---|
| 2014/0317640 | A1 | 10/2014 | Harm et al. |
| 2014/0355600 | A1 | 12/2014 | Lawson et al. |
| 2014/0372508 | A1 | 12/2014 | Fausak et al. |
| 2014/0372509 | A1 | 12/2014 | Fausak et al. |
| 2014/0372510 | A1 | 12/2014 | Fausak et al. |
| 2014/0373098 | A1 | 12/2014 | Fausak et al. |
| 2014/0379670 | A1 | 12/2014 | Kuhr |
| 2015/0004932 | A1 | 1/2015 | Kim et al. |
| 2015/0004933 | A1 | 1/2015 | Kim et al. |
| 2015/0023251 | A1 | 1/2015 | Giakoumelis et al. |
| 2015/0026477 | A1 | 1/2015 | Malatack et al. |
| 2015/0066865 | A1 | 3/2015 | Yara et al. |
| 2015/0081918 | A1 | 3/2015 | Nowack et al. |
| 2015/0082378 | A1 | 3/2015 | Collison |
| 2015/0100634 | A1 | 4/2015 | He et al. |
| 2015/0119050 | A1 | 4/2015 | Liao et al. |
| 2015/0181631 | A1 | 6/2015 | Lee et al. |
| 2015/0189014 | A1 | 7/2015 | Grunenberger |
| 2015/0236905 | A1 | 8/2015 | Bellan et al. |
| 2015/0281294 | A1 | 10/2015 | Nur et al. |
| 2015/0365480 | A1 | 12/2015 | Soto et al. |
| 2015/0370788 | A1 | 12/2015 | Bareket et al. |
| 2016/0011758 | A1 | 1/2016 | Dornbush et al. |
| 2016/0077693 | A1 | 3/2016 | Meyer et al. |
| 2016/0112475 | A1 | 4/2016 | Lawson et al. |
| 2016/0112521 | A1 | 4/2016 | Lawson et al. |
| 2016/0119291 | A1 | 4/2016 | Zollinger et al. |
| 2016/0127254 | A1 | 5/2016 | Kumar et al. |
| 2016/0149956 | A1 | 5/2016 | Birnbaum et al. |
| 2016/0162172 | A1 | 6/2016 | Rathod |
| 2016/0205519 | A1 | 7/2016 | Patel et al. |
| 2016/0226937 | A1 | 8/2016 | Patel et al. |
| 2016/0226979 | A1 | 8/2016 | Lancaster et al. |
| 2016/0234391 | A1 | 8/2016 | Wolthuis et al. |
| 2016/0239770 | A1 | 8/2016 | Batabyal et al. |
| 2016/0335074 | A1 | 11/2016 | Olivier et al. |
| 2017/0339283 | A1 | 11/2017 | Chaudhary et al. |
| 2018/0213028 | A1 | 7/2018 | Olivier et al. |
| 2020/0137147 | A1 | 4/2020 | Olivier et al. |

FOREIGN PATENT DOCUMENTS

| | | | |
|---|---|---|---|
| EP | 1464418 | A1 | 10/2004 |
| EP | 1522922 | A2 | 4/2005 |
| EP | 1770586 | A1 | 4/2007 |
| EP | 2053869 | A1 | 4/2009 |
| ES | 2134107 | A1 | 9/1999 |
| JP | 10294788 | A | 11/1998 |
| JP | 2004166000 | A | 6/2004 |
| JP | 2004220118 | A | 8/2004 |
| JP | 2006319914 | A | 11/2006 |
| WO | WO-9732448 | A1 | 9/1997 |
| WO | WO-2002087804 | A1 | 11/2002 |
| WO | WO-2006037492 | A1 | 4/2006 |
| WO | WO-2009018489 | A2 | 2/2009 |
| WO | WO-2009124223 | A1 | 10/2009 |
| WO | WO-2010037064 | A1 | 4/2010 |
| WO | WO-2010040010 | A1 | 4/2010 |
| WO | WO-2010101935 | A1 | 9/2010 |
| WO | WO-2011091085 | A1 | 7/2011 |

OTHER PUBLICATIONS

U.S. Appl. No. 15/154,700 U.S. Pat. No. 9,948,703, filed May 13, 2016, System and Method for Signaling Through Data Storage.

U.S. Appl. No. 15/914,401 U.S. Pat. No. 10,560,516, filed Mar. 7, 2018, System and Method for Signaling Through Data Storage.

U.S. Appl. No. 16/730,626, filed Dec. 30, 2019, System and Method for Signaling Through Data Storage.

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.

"U.S. Appl. No. 15/154,700, Corrected of Allowance mailed Mar. 22, 2018", 6 pgs.

"U.S. Appl. No. 15/154,700, Examiner Interview Summary mailed Nov. 3, 2017", 3 pgs.

"U.S. Appl. No. 15/154,700, Non Final Office Action mailed Jul. 26, 2017", 27 pgs.

"U.S. Appl. No. 15/154,700, Notice of Allowance mailed Dec. 8, 2017", 9 pgs.

"U.S. Appl. No. 15/154,700, Response filed Oct. 26, 2017 to Non Final Office Action mailed Jul. 26, 2017", 11 pgs.

"U.S. Appl. No. 15/914,401, Non Final Office Action mailed Jun. 13, 2019", 15 pgs.

"U.S. Appl. No. 15/914,401, Notice of Allowance mailed Nov. 7, 2019", 8 pgs.

"U.S. Appl. No. 15/914,401, Preliminary Amendment filed May 28, 2019", 10 pgs.

"U.S. Appl. No. 15/914,401, Response filed Sep. 16, 2019 to Non-Final Office Action mailed Jun. 13, 2019", 14 pgs.

"U.S. Appl. No. 16/730,626, Examiner Interview Summary mailed Sep. 24, 2021", 2 pgs.

"U.S. Appl. No. 16/730,626, Final Office Action mailed Jul. 14, 2021", 16 pgs.

"U.S. Appl. No. 16/730,626, Non Final Office Action mailed Mar. 15, 2021", 21 pgs.

"U.S. Appl. No. 16/730,626, Notice of Allowance mailed Oct. 21, 2021", 8 pgs.

"U.S. Appl. No. 16/730,626, Response filed Jun. 14, 2021 to Non Final Office Action mailed Mar. 15, 2021", 12 pgs.

"U.S. Appl. No. 16/730,626, Response filed Sep. 22, 2021 to Final Office Action mailed Jul. 14, 2021", 11 pgs.

"Archive Microsoft Office 365 Email I Retain Unified Archiving", GWAVA, Inc., Montreal, Canada, [Online] Retrieved from the Internet: <URL: http://www.gwava.com/Retain/Retain for_Office_365.php>, (2015), 4 pgs.

"Complaint for Patent Infringement", *Telinit Technologies, LLC v. Twilio Inc* 2:12-cv-663, (Oct. 12, 2012), 17 pgs.

"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Pravin, "Advantages of Application Server", [Online] Retrieved from the Internet: <http://data-centers.in/advantages-of-application-server/>, (Dec. 15, 2009), 1-4.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

* cited by examiner

SYSTEM AND METHOD FOR SIGNALING THROUGH DATA STORAGE

CROSS-REFERENCE TO RELATED APPLICATIONS

This application is a Continuation Application under 35 USC § 120 of U.S. patent application Ser. No. 16/730,626 entitled "System And Method For Signaling Through Data Storage," filed on Dec. 30, 2019, which is a continuation of U.S. patent application Ser. No. 15/914,401, filed May 7, 2018, which is a continuation of U.S. patent application Ser. No. 15/154,700, filed May 13, 2016, which claims the benefit of U.S. Provisional Application Ser. No. 62/265,557, filed on Dec. 10, 2015, U.S. Provisional Application Ser. No. 62/163,270, filed on May 18, 2015, U.S. Provisional Application Ser. No. 62/161,724, filed on May 14, 2015, and U.S. Provisional Application Ser. No. 62/161,719, filed on May 14, 2015, all of which are incorporated in their entirety by this reference.

TECHNICAL FIELD

This invention relates generally to the communication field, and more specifically to a new and useful system and method for signaling through data storage in the communication field.

BACKGROUND

The explosion of mobile devices hasn't replaced other types of devices from use. Instead, today's world increasingly sees users with many devices, using them interchangeably to accomplish tasks. On the way to work users check email and chat rooms on mobile phones, and then at work users transition to laptops to continue working. When users enter a conference room, they may transition again to a different machine, but in modern apps the expect context to be maintained across those devices. Building out applications with such robust multi-modal accessibility is challenging and time consuming process. Additionally, many new applications depend on establishing various forms of communication, often real-time messaging communication. However, building such technical solutions is complicated and time consuming. Thus, there is a need in the communication field to create a new and useful system and method for signaling through data storage. This invention provides such a new and useful system and method.

DETAILED DESCRIPTION

The following description of preferred embodiments of the invention is not intended to limit the invention to these preferred embodiments, but rather to enable any person skilled in the art to make and use this invention.

1. System for Signaling Through Data

Figure 1:
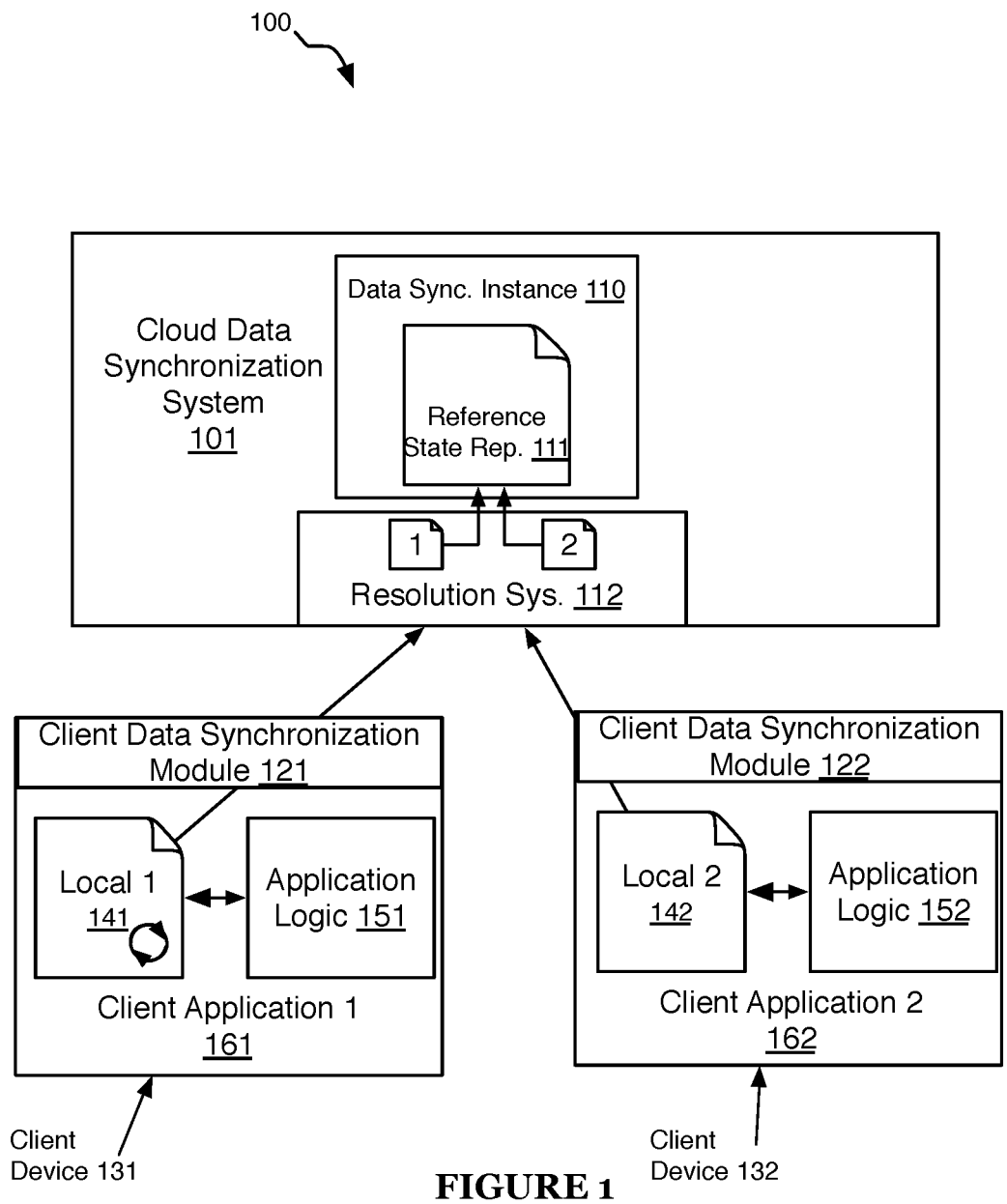
FIG. 1 is a schematic representation of a system, in accordance with embodiments.

As shown in FIG. 1, in some embodiments, a system 100 for signaling through data storage of a preferred embodiment includes a cloud data synchronization system 101 that creates a data synchronization instance 110 to coordinate state management of a set of client devices (devices 131 and 132) with client data synchronization modules (121 and 122). The system 100 functions to provide an alternative approach to signaling between client devices (client devices 131, 132). In some implementations, the system 100 enables an approach to signaling that involves a client (131, 132) accessing a locally stored state representation object (141, 142). In some implementations, the data synchronization instance 110 of the system 100 then synchronizes the state representation object (141, 142) between clients (131, 132). In some implementations, the system 100 is implemented in part through a highly available, cloud-based state management system that handles the ingestion of objects and provides the capability to distribute objects to interested parties. The system 100 can remove much of the complexity and cost of an application developer goes through in building a product with client-managed state. The system 100 may additionally address some of the potential challenges of client-managed state machines such as consistency and flexibility in updating the client.

As shown in the embodiment of FIG. 1, the cloud data synchronization system 101 includes the data synchronization instance 110, and a resolution system 112. The data synchronization instance 110 includes a reference state representation object 111. The client device 131 includes a client data synchronization module 121 and a client application 161. The client device 131 also includes a local state representation object 141 and application logic 151. The client device 132 includes a client data synchronization module 122 and a client application 162. The client device 132 also includes a local state representation object 142 and application logic 152.

Figure 2:
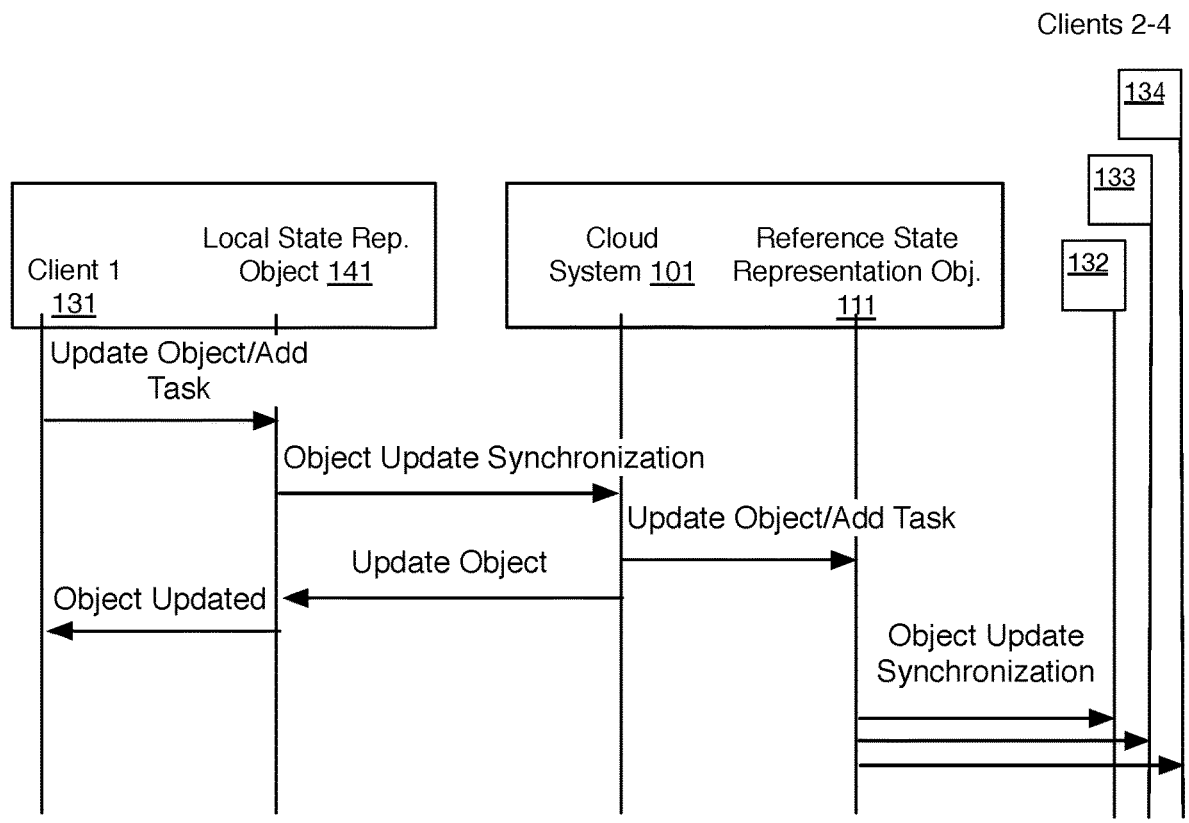
FIG. 2 is a communication flow diagram of data synchronization between multiple clients, in accordance with embodiments.

As shown in an exemplary application of the system 100 in FIG. 2, a client application (161 of the client device 131) writes data to the state representation object 141. The data represents how the client application 161 wants to update the state. In some implementations, the client application 161 adds a message to a chat conversation. In some implementations, the client application 161 writes directly to the state representation object 141 or uses a framework (such as an application framework). The system 100 automatically synchronizes the desired state changes through the cloud data synchronization system 101. If the desired state change conflicts with the reference state representation object 111, the conflicts are resolved. Then the cloud data synchronization system 101 synchronizes the updated state to a set of clients (132) that are subscribed to updates to that state representation object 111. The set of clients (132) then updates their state to reflect the synchronized update of their local state representation objects (142).

The cloud data synchronization system 101 functions to provide a network accessible resource to manage data synchronization. The cloud data synchronization system 101 can serve as the source of truth concerning state information. Clients (131, 132) synchronize with the cloud data synchronization system 101 rather than resolving various updates from multiple clients to determine their own state. In some implementations, the cloud data synchronization system 101 is hosted in a cloud-based, distributed computing infrastructure. In some implementations, the cloud data synchronization system 101 is hosted on any suitable computing infrastructure. In some implementations, the cloud data synchronization system 101 is accessible over the internet, a local network, or any suitable data connection. In some implementations, the data synchronization system 101 is implemented ad-hoc between multiple clients, where a master client device may run a client-based implementation of the data synchronization system.

In some implementations, the cloud data synchronization system 101 is part of a multi-tenant system wherein multiple and distinct entities can build applications and/or services utilizing the system 101 while sharing common computing resources. In some implementations, the multi-tenant cloud data synchronization system includes an accounting system that partitions usage and configuration by accounts and optionally sub-accounts of parent accounts. For example, an application developer can build a data synchronization solution for a first mobile application, and a second developer can build a data synchronization solution for a different and distinct mobile application. Authentication, configuration, usage, data, billing, and/or other properties of the system can be kept distinct. In some implementations, the system 101 is implemented as a single-tenant system.

In some implementations, the cloud data synchronization system 101 includes a data synchronization storage system, which functions to store data, records, and other information that relates to data synchronization instances (e.g., 110).

In some implementations, the cloud data synchronization system 101 includes at least one programmatic interface. In some implementations, the programmatic interface includes an API. In some implementations, the API is a RESTful API but may alternatively be any suitable API such as SOAP or custom protocol. The RESTful API works according to an application layer request and response model. An application layer request and response model may use an HTTP-based protocol (HTTP or HTTPS), SPDY, or any suitable application layer protocol. Herein, HTTP may be used, but should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE. In some implementations, the data synchronization instances (e.g., 110), aspects of the data synchronization instances, and/or other aspects can be manipulated and accessed as RESTful API resources. In some implementations, the programmatic interface includes a client interface, which enables clients or other devices to interface with the cloud data synchronization system 101. In some implementations, the client interface is a restricted or private API or any suitable programmatic interface. In some implementations, client devices use the public API using a client SDK, library, or native implementation. In some implementations, the system 101 includes an administration user interface. An account or subaccount holder can use the administration user interface to manage data synchronization and state management.

The data synchronization instance 110 functions to encapsulate and characterize the management of data synchronization between clients (e.g., 131, 132). In some implementations, the data synchronization instance 110 is preferably accessible through the programmatic interface(s). In some implementations, a data synchronization instance is uniquely mapped to a session state. In some implementations, an application uses multiple data synchronization sessions, which correspond to multiple, different communication sessions, threads, or channels. For example, an IP messaging application can use a different data synchronization instance for each chat thread.

In some implementations, a data synchronization instance includes option configuration. In some implementations, various options enable control over data handling, access permissions, validation rules, and/or other forms of customization. In some implementations, data handling enables various rules to be enforced related to how the data is stored such as setting how data is stored geographically, how long data is persisted, and/or other suitable options. In some implementations, permissions are set on how the data synchronization instance can be accessed and/or modified. For example, access permissions can be set so that a first set of entities is permitted to edit state while a second set of clients can only access the state. In some implementations, the data synchronization instance 110 manages the state representation object 111 that is synchronized between clients. In some implementation, the state representation object (111, 141, 142) is stored and/or represented in any suitable form. In some implementations, the state representation object (111, 141, 142) is a text-based document that expresses information through a suitable data structure object. In some implementations, the state representation object (111, 141, 142) is one of JSON, plain text, SML, base64 encoded items, or any suitable document type. In some implementations, the state representation object (111, 141, 142) uses key value stores to characterize various properties of the state. In some implementations, standardized protocol/syntax is expected for a state representation object (111, 141, 142). In some implementations, a subset of basic keys and values are required, recommended, and/or optional. For example, a state representation object can follow a basic pattern for indicating how state updates are time stamped and/or prioritized so that conflicts are resolved. In some implementations, at least a portion of the state representation object (111, 141, 142) is highly customized to adapt to the particular application and/or use case. For example, various keys and hierarchical data structures can be used to represent an application's particular state.

In some implementations, the cloud data synchronization system 101 includes a resolution system 112, which functions to process state updates to a data synchronization instance and resolve inconsistencies. In some implementations, a set of rules and/or heuristics are built into the resolution system 112 so that inconsistent state updates made from various clients can be resolved. In some implementations, the resolved state and/or any suitable resolution alerts is communicated to clients (131, 132) through the state representation object (111, 141, 142).

The client data synchronization modules 121, 122 function to act as a client tool for interacting with the data representation object. In some implementations, the client data synchronization modules 121, 122 operate as a component of an application or service on a client device (131, 132). In some implementations, a client device (e.g., 131, 132) is at least one of a phone, a wearable computer, a personal computer, a browser, an IoT device, and/or any suitable computing device. In some implementations, client data synchronization model (121, 122) is part of an SDK, a library, or any development tool. In some implementations, client data synchronization model (121, 122) is provided for a variety of popular device clients (e.g. Android, iPhone, in-browser JavaScript) and server clients (e.g. NodeJS, Ruby on Rails, Java . . . ) languages/platforms. From the developer perspective, a set of tools is provided for interacting with a local state representation object. The synchronization of the state representation object (141, 142) is transparent to the application (161, 162).

Figure 3:
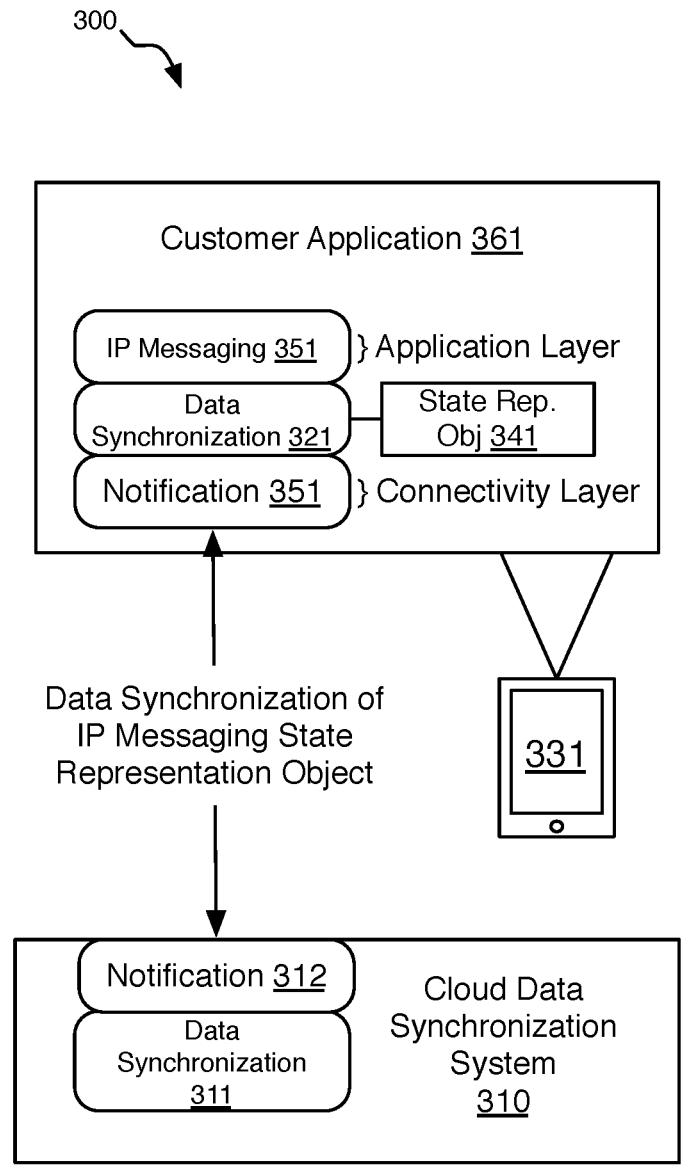
FIG. 3 is a schematic representation of the technology layers employed in a system, in accordance with embodiments.

The system 100 can be usable without any knowledge of underlying storage, retrieval, and synchronization mechanisms. The system 100 and in particular the data synchronization elements described above can be used with additional technology layers to further power application functionality as shown in FIG. 3. In some embodiments, the system 300 of FIG. 3 is similar to the system 100 of FIG. 1.

In some implementations, the system 331 is similar to the client device 131 of FIG. 1. In some implementations, the cloud data synchronization system 310 is similar to the cloud data synchronization system 101 of FIG. 1.

In some implementations, the system 331 includes an application layer 351 that operates on top of the data synchronization layer 321. In some implementations, the application layer 351 is customized for business logic and functionality specific to the use case. In some implementations, the application layer 351 is an IP messaging layer. In some implementations, as part of an IP messaging layer, a client SDK or library is provided that interfaces with a state representation object 341 to support general IP messaging operations. In some implementations, the application 361 uses the IP messaging layer 351 to create channels, add members, and/or send/read messages. During these operations, the IP messaging layer 351 uses the data synchronization layer 321 to update and read from the data representation object 341 and simultaneously the data representation object 341 is synchronized to various clients as part of a data synchronization instance. In some implementations, the application layer 351 is an IoT (internet of things) device management layer. In some implementations, common IoT tasks and operations are represented in a higher-level abstraction layer that utilizes the underlying data synchronization layer to coordinate operation of multiple IoT devices.

In some implementations, the system 331 includes a connectivity layer 351 that is used by the data synchronization layer 321 to coordinate communication with the cloud 310 and client devices. In some implementations, the connectivity layer 351 is a notification layer that enables push notifications. In some implementations, the connectivity layer 351 is a polling layer that manages how clients and the cloud 310 periodically request updates.

In some implementations, the data synchronization layer 311 is similar to the data synchronization layer 321. In some implementations, the data synchronization layer 311 is similar to the data synchronization instance 110 of FIG. 1. In some implementations, the data synchronization layer 311 is constructed to update and read from a reference data representation object of the cloud data synchronization system 310. In some implementations, the data synchronization layer 311 is constructed to synchronize the reference data representation object of the cloud data synchronization system 310 to various clients as part of a data synchronization instance of the system 310. In some implementations, the data synchronization layer 311 is constructed to update and read from a reference data representation object of the cloud data synchronization system 310, and simultaneously synchronize the reference data representation object of the cloud data synchronization system 310 to various clients as part of a data synchronization instance of the system 310.

In some implementations, the data synchronization instance of the system 310 is similar to the data synchronization instance 110 of FIG. 1.

In some implementations, the reference data representation object of the cloud data synchronization system 310 is similar to the reference state representation object 111 of FIG. 1.

In some implementations, the connectivity layer 312 of the system 310 is similar to the connectivity layer 351. In some implementations, the connectivity layer 312 is used by the data synchronization layer 311 to coordinate communication with the client devices (331). In some implementations, the connectivity layer 312 is a notification layer that enables push notifications. In some implementations, the connectivity layer 312 is a polling layer that manages how clients and the cloud 310 periodically request updates.

2. Method for Signaling Through Data Synchronization

Figure 4:
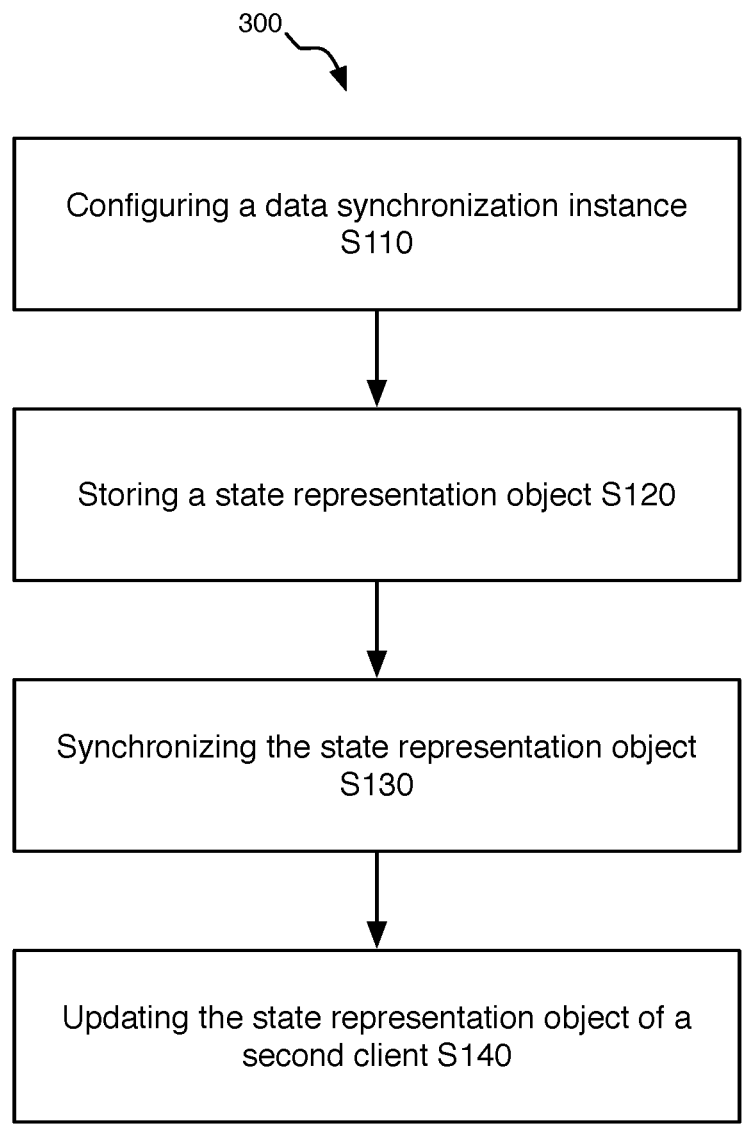
FIG. 4 is a flow diagram representation of a method, in accordance with embodiments.

As shown in FIG. 4, a method 400 for signaling through data synchronization of a preferred embodiment can include configuring a data synchronization instance S110, storing a state representation object S120, synchronizing the state representation object S130, and updating the state representation object of a second client S140. The method 400 functions to use synchronization of documents that characterize application state to facilitate communication between a set of client devices (e.g., 131, 132). The method 400 provides an alternative approach to communicating between clients (e.g., 131, 132).

The method 400 can be used in a variety of scenarios. In some implementations, in a first scenario, the method 400 is used to synchronize multiple devices (e.g., 131, 132) of a single account. For example, a mobile phone application and a desktop browser version of some service can be made to be eventually consistence by building on top of the data synchronization layer (e.g., 321). In some implementations, in a second scenario, the method 400 is used in synchronizing communication between multiple devices (e.g., 131, 132) of different accounts. For example, a chat program and the state of the chat can be synchronized between two accounts using the method 400. The state representation object is preferably updated in substantially real-time such that real-time communication can be conveyed. In some implementations, the state representation object of a client device (e.g., 141, 142 of FIG. 1, 341 of FIG. 3) is updated in substantially real-time such that real-time communication can be conveyed. In some implementations, the state representation object of the cloud data synchronization system (e.g., 111 of FIG. 1) is updated in substantially real-time such that real-time communication can be conveyed.

In some embodiments, the method 400 is implemented by a system substantially similar the system 100. In some embodiments, the method 400 is implemented by a system substantially similar the system 300. In some embodiments, the method 400 is implemented by any suitable system. In some implementations, the method 400 is implemented by a system similar to the system 300, and the method 400 is used in combination with an application layer (similar to 351) where the synchronization of state is used to provide an IP messaging framework. In some implementations, the method 400 is implemented by a system similar to the system 300, and the method 400 is used in combination with an application layer (similar to 351) where the synchronization of state is used to provide an IoT device management framework. In some implementations, the method 400 is implemented by a system similar to the system 300, and the method 400 is used in combination with an application layer (similar to 351) where the synchronization of state is used to provide any suitable application framework. In some implementations, the method 400 is used with a connectivity layer (similar to 351, 312) to facilitate how notifications and information is relayed between clients and/or the cloud system.

Block S110, which includes configuring a data synchronization instance (e.g., 110 of FIG. 1), functions to establish resource through which data can be synchronized. In some implementations, configuring a data synchronization instance includes creating the data synchronization instance and setting any customization of the instance. In some implementations, a data synchronization instance is created by an account (of the cloud data synchronization system) prior to when data synchronization capabilities are required, which may be in anticipation of usage by an account or when an account submits a request to begin some task that will utilize data synchronization. In some implementations, a data synchronization instance is created through an administrator user interface. In some implementations, a data synchronization instance is created through a programmatic interface (e.g., REST API). In some implementations, a data synchronization instance is created through a client application request (which may use a private or public programmatic interface). In some implementations, a data synchronization instance is identifiable. In some implementations, a unique identifier is automatically generated during creation. In some implementations, a friendly name is used. In some implementations, the friendly name (and the identifier) is scoped globally within at least one of the platform, within an account or subaccount scope, or with any suitable scope. In some implementations, clients use the identifier when addressing state updates and synchronization. Clients using the same identifier will share information through their respective state representation objects (e.g., 141, 142). In some implementations, a single data synchronization instance (e.g., 110) is used to characterize multiple state representation objects (e.g., 111). This architecture may be used so that various customization options can be simply controlled and managed through a single data synchronization instance (e.g., 110). In some implementations, a data synchronization instance (e.g., 110) is used for the synchronization of a single state representation object (e.g., 111).

In some implementations, setting customization of the instance (e.g., 110) customizes various options of the data synchronization instance (e.g., 110). In some implementations, setting customization includes setting geographic data storage options. In some implementations, geographic data storage options determine which region or regions are used for storing data. In some implementations, the geographic data storage options provide a blacklist of countries, regions, or locations where data should not be stored. In some implementations, setting customization includes setting data encryption settings. In some implementations, data encryption is managed on the edge clients. In some implementations, data encryption options are enabled in association with the data synchronization instance (e.g., 110). In some implementations, setting customization includes setting permissions of the data synchronization instance (e.g., 110), which functions to provide an access control list to enforce policy on interactions with the data synchronization instance. In some implementations, the permissions define the read permissions, write permissions, and/or other management permissions. In some implementations, permissions are set by at least one of account, device identity, device properties, and/or any suitable rule. For example, one account may only have read access permissions and so clients of that account can be driven by the state of the data synchronization instance but may not be able to alter state.

Block S120, which includes storing a state representation object, functions to use a local object (e.g., 141, 142) as a conduit for implying state update requests with connected clients (e.g., 131, 132). In some implementations, storing a state representation object includes storing a reference state representation object (e.g., 111 of FIG. 1) at the cloud data synchronization system (e.g., 101, 310). In some implementations, storing a state representation object includes storing a reference state representation object (e.g., 111 of FIG. 1) of a data synchronization instance (e.g., 110) of the cloud data synchronization system (e.g., 101, 310). In some implementations, the state representation object (e.g., 141, 142) is stored locally within a client device (e.g., 131, 132). For example, an application may store and maintain a local representation of the state representation object. In some implementations, the method 400 includes providing a client data synchronization module (e.g., 121, 122 of FIG. 1), which functions to provide a tool for interacting with a state representation object (e.g., 141, 142). In some implementations, manipulation of the state representation object (e.g., 141, 142) through the client data synchronization module (e.g., 121, 122) allows the state representation object (e.g., 141, 142) to be updated in a controlled and consistent manner. In some implementations, updated state information is added to the state representation object (e.g., 141, 142) along with supporting meta data. For example, a timestamp synchronized to a reference clock can be added to updated information to facilitate resolving conflicts. However, alternative approaches may enable direct manipulation of the state representation object. In some implementations, actions taken to the state representation object (e.g., 141, 142) are performed without consideration of synchronizing state.

In some implementations, a local state representation object (e.g., 141, 142) is stored for each client application (e.g., 161, 162). In some implementations, a state representation object is store d in the cloud data synchronization system (e.g., 101, 310). In some implementations, the cloud data synchronization system (e.g., 101, 310) includes a single reference source of truth representation (e.g., 111). In some implementations, the cloud data synchronization system (e.g., 101, 310) includes various instances of the state representation object, which depend on the reference source. In some implementations, a local state representation object (e.g., 141, 142) is created in association with an identifier of a data synchronization instance (e.g., 110). State representation objects of other client instances (e.g., 132, 134 of FIG. 2) that use a corresponding identifier will also be synchronized with the reference representation object (e.g., 111). In some implementations, local storage of the state representation object (e.g., 141, 142) functions to provide recovery during connectivity interruption. If a client device loses network access, the application can continue to update state. Updates made while offline are eventually resolved when connectivity is re-established.

In some implementations, the method 400 includes providing an application layer (e.g., 151, 152 of FIG. 1, 351 of FIG. 3) to interface with the state representation object (e.g., 141, 142, 341), which functions to abstract management of the state representation object into a set of application-specific interactions. In some implementations, an application-specific SDK or library is provided that utilizes a state representation object (e.g., 141, 142, 341). In some implementations, an IP messaging application layer (e.g., 351) provides higher-level business level to the management of chat channels, channel participants, and message history. From the developer perspective, instructions are made to create and join a chat channel and to add a message. Instructions are transformed into state updates that are characterized in the state representation object. In some implementations the application layers include at least one of an IoT device management layer, a video conferencing layer, a customer service layer, a gaming layer, and/or any suitable application layer.

Block S130, which includes synchronizing the state representation object, functions to coordinate communication of state updates. Changes to the local state representation object (e.g., 141, 142, 341) are detected within the client (e.g., 131, 132, 331) and then uploaded to the cloud data synchronization system (e.g., 101, 310). Similarly, outside changes to a state representation object (e.g., 142) by another client (e.g., 132) are transferred and applied to the local version (e.g., 141) on the client (e.g., 131). In some implementations, updates are transmitted to the remote cloud system (e.g., 101, 310) in response to a change. In some implementations, a minimum time since the last update is enforced to limit the number of notifications transmitted to the cloud system (e.g., 101, 310). In some implementations, updates are transmitted periodically. In some implementations, the cloud system (e.g., 101, 310) requests updates from the client (e.g., 131, 132, 331). In other words, the cloud system (e.g., 101, 310) polls the clients (e.g., 131, 132, 331) for updates. Any suitable approach may be used in how and when updates are synchronized between clients and the cloud system. Synchronizing the state representation object additionally includes distributing state information updates to a client (e.g., 131, 132, 331). In some implementations, updates are transmitted back to the clients (e.g., 131, 132) in response to updates made to the reference representation (e.g., 111) of state information in the cloud (e.g., 110). In some implementations, the updates are transferred and handled through the client data synchronization module (e.g., 121, 122) in block S140 such that the end application logic (e.g., 151, 152, 162, 162) built by the developer does not need to process incoming updates—the updates are automatically synchronized. For example, if the client is a user application, the view of the application can be reactive to changes in the state representation object such that any synchronized updates can be automatically reflected in the state of the user application.

In some implementations, the full state representation object is transferred between the clients and cloud system. In some implementations, the differences or partial representations are transmitted to reduce the amount of data transferred during each update. In some implementations, synchronizing the state representation object includes the cloud system (e.g., 101, 310) tracking the version of state representation for associated clients. The version information can be used to determine which clients need updates.

In some implementations, the method 400 includes providing a connectivity layer (e.g., 351), which functions to provide a framework that manages how the information and alerts are transmitted between the clients and the cloud system. In some implementations, the connectivity layer (e.g., 351) uses any suitable communication transport layer such as a HTTP-based protocol (HTTP or HTTPS), SPDY, or any suitable transport protocol. In some implementations, the connectivity layer (e.g., 351) facilitates push notifications where updates can be actively pushed or transmitted to appropriate entities. In some implementations, in the case of sending an update from the cloud system to a client, the update is accompanied by a notification such as a push notification displayed within the operating system of the client device. In some implementations, the connectivity layer specifies a polling process in which the clients and/or the cloud system poll for updates.

In some implementations, synchronizing the state representation object includes resolving conflicts. In some implementations, the cloud system receives updated state information from a plurality of clients. In some implementations, updates to the state representation may conflict with updates from one or more other clients. For example, if one client made changes during a temporary lack of connectivity, those changes could be in conflict with changes made by other clients. In some implementations, the cloud system processes the various updates from clients and determines a resolution that incorporates the changes into a single state representation. In some implementations, time-based prioritization of updates are used. In some implementations, rules are defined on how particular updates are prioritized and resolved. In some implementations, rules are pre-configured as part of the configuration of a data synchronization instance. In some implementations, resolving conflicts includes retrieving resolution guidance from an outside source. For example, a configured callback URI can be messaged over HTTP/S with relevant information. In some implementations, the relevant information includes current reference state information and the conflicting state updates. In some implementations, the system of the callback URI sends a response that includes instructions on how to resolve the conflict.

Block S140, which includes updating the operational state of a second client based on the state representation object, functions to make an application or service react to synchronized changes to the state representation object. In some implementations, a client data synchronization module (e.g., 121, 122) includes a framework for signaling when the state representation object (e.g., 141, 142) was updated. In some implementations, how the state representation object (e.g., 141, 142) was updated is communicated. In some implementations, the application logic (e.g., 151, 152) is built to automatically respond to changes in the state representation object (e.g., 141, 142).

The use of synchronized state representation data can provide an alternative to request response signaling in a communication application. All the state information that is to be communicated between clients is preferably represented within the state representation object (e.g., 141, 142), and so inbound communications or state changes are communicated through the state representation object (e.g., 141, 142) as opposed to signaling messages transmitted through some protocol.

As one exemplary use case, the method for signaling through data synchronization can be applied to a messaging application. In some implementations, the messaging application is designed using a data synchronization and IP messaging framework that facilitates the use of a data representation object (e.g., 141, 142, 341) in synchronization with a cloud system (e.g., 101, 310). In some implementations, a first client application (e.g., 161) creates a new chat channel to communicate with the other channels. In some implementations, a data synchronization instance (e.g., 110) is created and a set of client applications preferably joins the data synchronization instance. In some implementations, a local data representation object (e.g., 141, 142, 341) or file is established on each of the client devices (e.g., 131, 132, 331). In some implementations, the state of the local data representation object (e.g., 141, 142) represents the properties of the channel such as channel name, members, channel permissions, and/or other settings. These channel properties are synchronized across all the local data representation objects. Then a client application will post a new message. That client will add the new message as an element in the state representation object, and the state representation object will be synchronized with the cloud system. The cloud system will update the reference version of the state representation object and transmit the updated information to the other clients. In some implementations, the clients update their display to represent the new message. In some implementations, subsequent messages, media, and/or other channel interactions is communicated using the state representation object.

3. Application Platform Systems

Figure 5A:
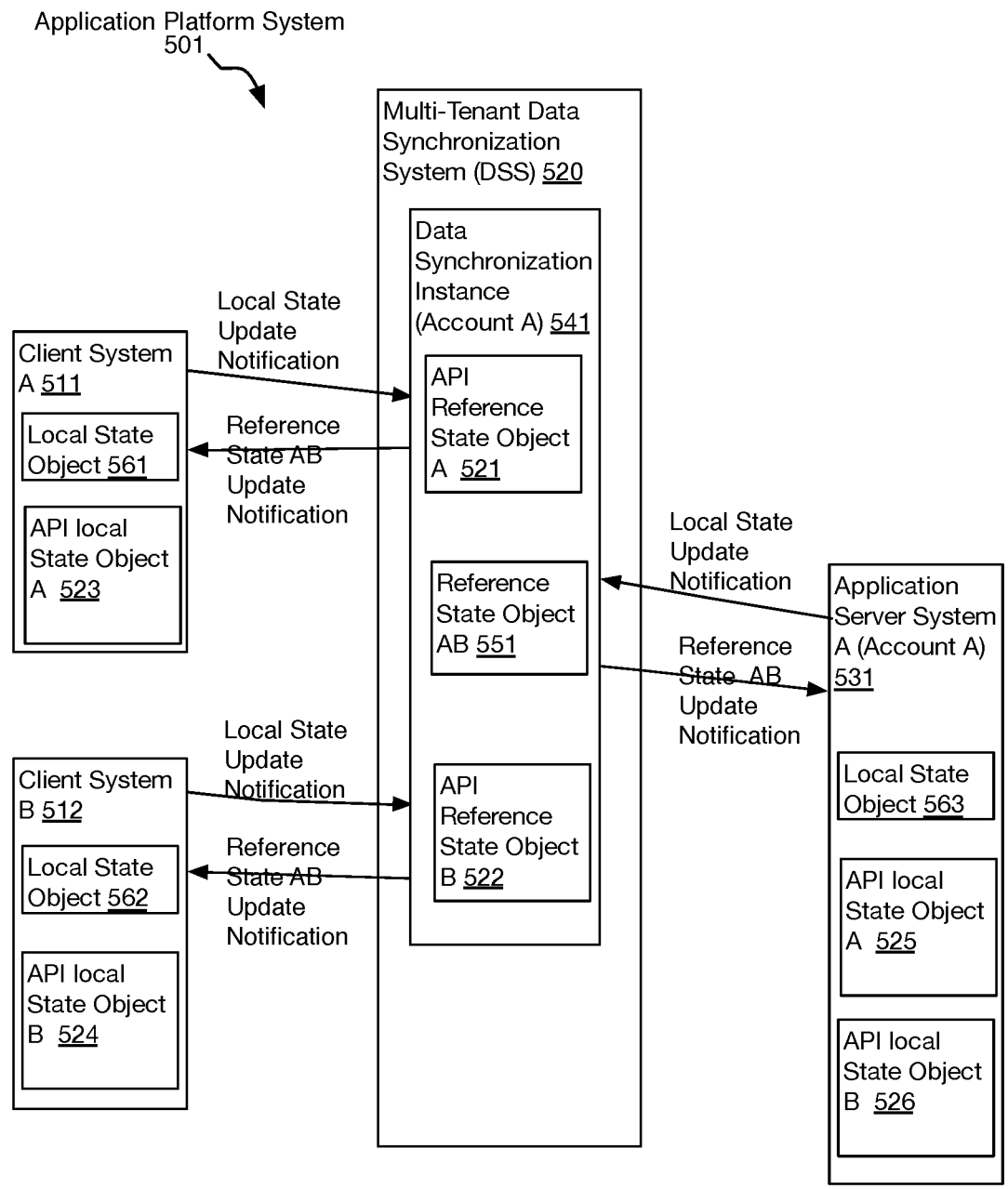
FIGS. 5A-5C are schematic representations of systems, in accordance with embodiments.
Figure 5B:
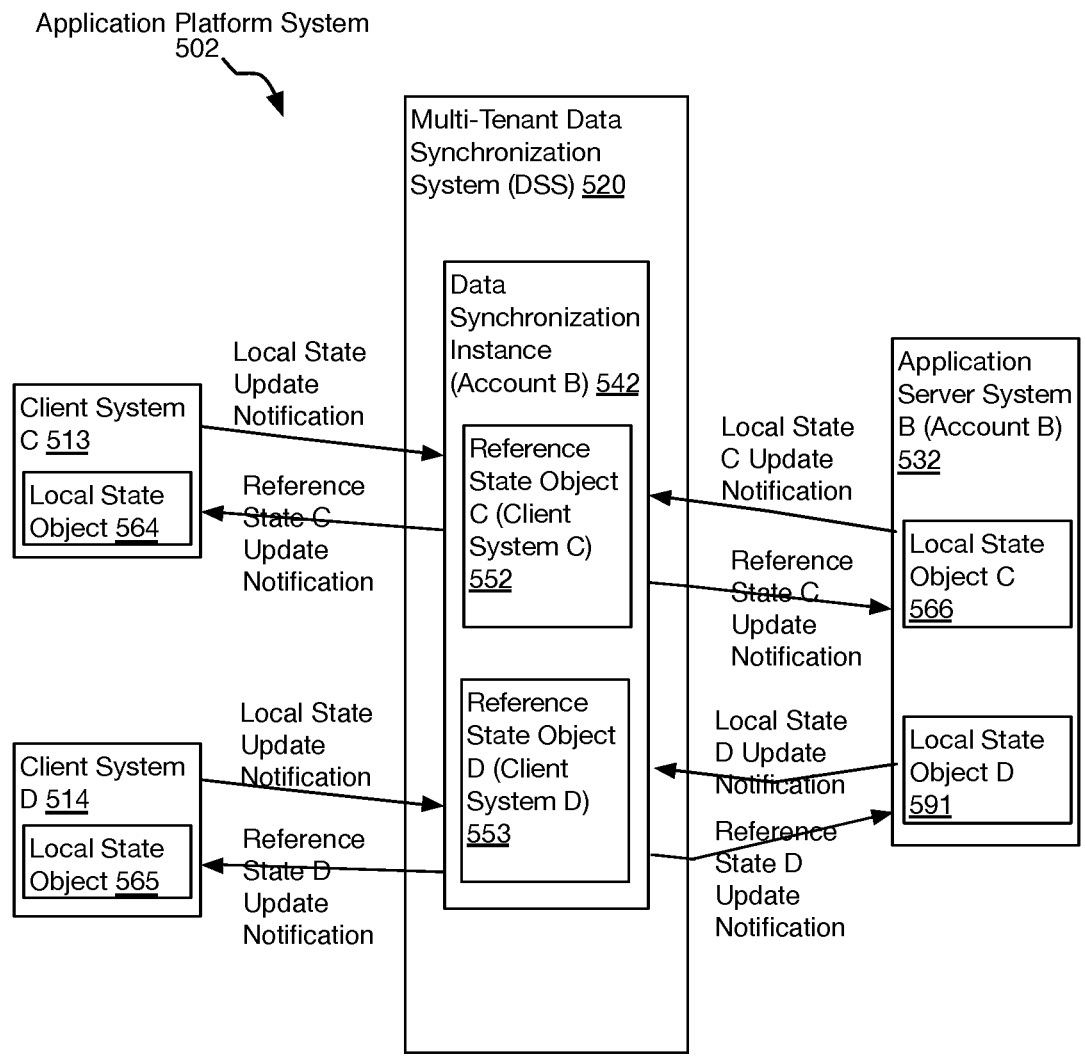
Figure 5C:
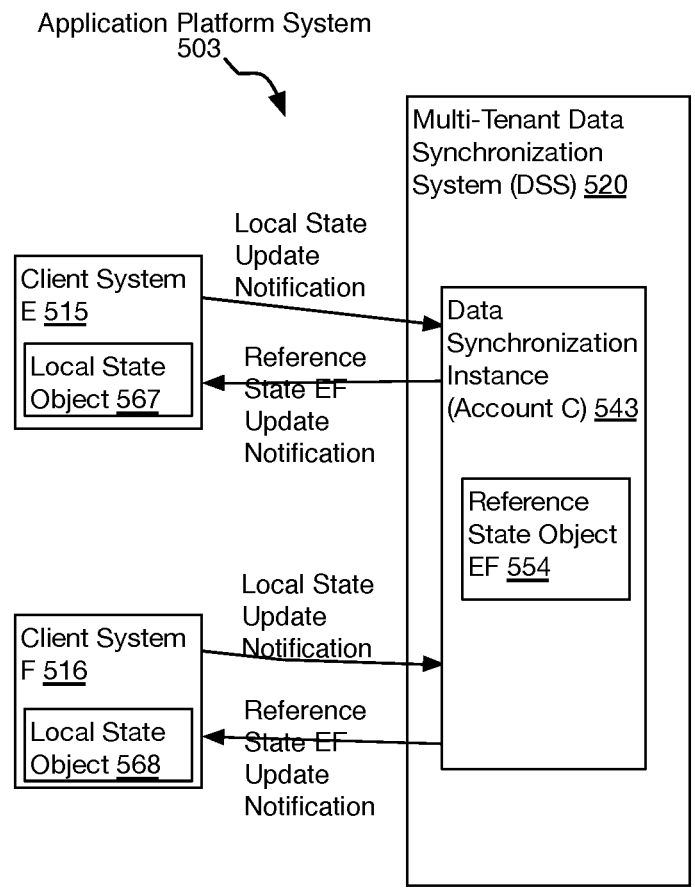

FIGS. 5A-C are schematic representations of application platform systems 501-503, in accordance with embodiments. In some implementations, the state objects of FIGS. 5A-C (e.g., 521-526, 551-554, 561-568, 591) are files. In some implementations, the state objects of FIGS. 5A-C (e.g., 521-526, 551-554, 561-568, 591) are files stored in a file system. In some implementations, the state objects of FIGS. 5A-C (e.g., 521-526, 551-554, 561-568, 591) are text files. In some implementations, the state objects of FIGS. 5A-C (e.g., 521-526, 551-554, 561-568, 591) are human-readable files. In some implementations, the state objects of FIGS. 5A-C (e.g., 521-526, 551-554, 561-568, 591) are XML files.

FIG. 5A

In some implementations, the application platform system 501 of FIG. 5A provides a service of the application server system 531 to client systems 511 and 512. In some implementations, the service of the application server system 531 is a communication service that provides for communication between the client system 511 and the client system 512. In some implementations, the service of the application server system 531 is a communication service that provides a chat session for communication between the client system 511 and the client system 512.

The application platform system 501 includes the client systems 511 and 512, the DSS 520, and the application server system 531.

The client system 511 includes a local client API state object 523 and a local communication state object 561. In some implementations, the local communication state object 561 is a chat channel state object. The client system 512 includes a local client API state object 524 and a local communication state object 562. In some implementations, the local communication state object 562 is a chat channel state object.

The DSS 520 includes a data synchronization instance 541 for an account of the DSS ("Account A"). The data synchronization instance 541 includes a reference API state object 521, a reference API state object 522, and a reference communication state object 551. In some implementations, the reference communication state object 551 is a chat channel state object.

The application server system 531 includes a local server API state object 525, a local server API state object 526, and a local communication state object 563. In some implementations, the local communication state object 563 is a chat channel state object.

In some implementations, the local communication state objects 561, 562 and 563 are synchronized with the reference communication state object 551. In some implementations, the local client API state object 523 and the local server API state object 525 are synchronized with the reference API state object 521. In some implementations, the local client API state object 524 and the local server API state object 526 are synchronized with the reference API state object 522. In some implementations, the local client API state object 523, the local server API state object 525, and the reference API state object 521 provide communication between the client system 511 and the application server system 531. In some implementations, the local client API state object 523, the local server API state object 525, and the reference API state object 521 provide communication of API requests and API responses of an API of the application server system 531 between the client system 511 and the application server system 531.

In some implementations, the local client API state object 524, the local server API state object 526, and the reference API state object 522 provide communication between the client system 512 and the application server system 531. In some implementations, the local client API state object 524, the local server API state object 526, and the reference API state object 522 provide communication of API requests and API responses of an API of the application server system 531 between the client system 512 and the application server system 531.

In some implementations, the state objects 523, 521 and 525 include API request data and API response data communicated between the client system 511 and the application server system 531. In some implementations, the state objects 524, 522 and 526 include API request data and API response data communicated between the client system 512 and the application server system 531. In some implementations, API request data includes at least one of: create new chat API request data, join chat request data, add participant request data, send message to chat request data. In some implementations, API response data includes at least one of: create new chat API response data, join chat response data, add participant response data, send message to chat response data.

In some implementations, create new chat API request data includes at least one of chat title and chat description. In some implementations, create new chat API response data includes at least one of request execution status, an identifier of a reference state object (e.g., 551) for the created chat, and a unique identifier of the chat channel.

In some implementations, join chat request data includes at least the unique identifier of the chat channel. In some implementations, join chat response data includes at least one of request execution status and an identifier of a reference state object (e.g., 551) for the joined chat.

In some implementations, add participant request data includes at least one of the unique identifier of the chat channel and a username of a participant to be added to the chat channel. In some implementations, add participant response data includes at least one of request execution status and an identifier of a reference state object (e.g., 551) for the chat.

In some implementations, send message to chat request data includes at least one of the unique identifier of the chat channel and a chat message. In some implementations, send message to chat response data includes at least one of request execution status and a unique identifier of the sent chat message.

In some implementations, the local communication state objects 561, 562 and 563 and the reference communication state object 551 provide communication between the client system 511 and the client system 512. In some implementations, the local communication state objects 561, 562 and 563 and the reference communication state object 551 provide chat channel communication between the client system 511 and the client system 512.

In some implementations, the state objects 561, 562, 563 and 551 include message data communicated between the client system 511 and the client system 512. In some implementations, the state objects 561, 562, 563 and 551 include chat channel state data for a chat channel in which the client system 511 and the client system 512 participate. In some implementations, the chat channel state includes chat messages of the chat channel. In some implementations, the chat channel state includes at least one of chat identifier, chat title, chat description, list of chat messages and their properties (e.g., sender, time stamp, read status), list of chat participants and their properties (e.g., role).

In some implementations, the client systems 511 and 512, the data synchronization instance 541, and the application server system 531 are associated with a first DSS account (e.g., "Account A") of a plurality of accounts managed by an account system (not shown) of the DSS 520. In some implementations, the client systems 511 and 512, and the application server system 531 are systems of an account holder of a first DSS account (e.g., "Account A") of a plurality of accounts managed by an account system (not shown) of the DSS 520. In some implementations, the client systems 511 and 512, and the application server system 531 are external to the DSS 520.

In some implementations, the client systems 511 and 512 are similar to the client systems 131 and 132 of FIG. 1. In some implementations, the client systems 511 and 512 are similar to the client system 331 of FIG. 3. In some implementations, the state objects 561, 562, 563, and 523-526 are similar to the state objects 141 and 142 of FIG. 1. In some implementations, the state objects 561, 562, 563, and 523-526 are similar to the state object 341 FIG. 3. In some implementations, the state objects 521, 522 and 551 are similar to the state object 111 of FIG. 1. In some implementations, the DSS 520 is similar to the cloud data synchronization system 101 of FIG. 1. In some implementations, the DSS 520 is similar to the cloud data synchronization system 310 of FIG. 3. In some implementations, the data synchronization instance 541 is similar to the data synchronization instance 110 of FIG. 1. In some implementations, the DSS 520 includes a resolution system similar to the resolution system 112 of FIG. 1. In some implementations, the application server system 531 is similar to the client devices 131 and 132 of FIG. 1. In some implementations, the application server system 531 is similar to the client device 331 of FIG. 3.

In some implementations, a first set of one or more data synchronization instances for the DSS account of the application server system 531 manages the reference communication state objects of the DSS account of the application server system 531, and a second set of one or more data synchronization instances for the DSS account of the application server system 531 manages the reference API state objects of the DSS account of the application server system 531. In some implementations, each state object of the DSS account of the application server system 531 is managed by a different data synchronization instance for the DSS account of the application server system 531.

In some implementations, the application server system 531 provides a plurality of communication channels, the application server system 531 includes a local communication state object (similar to 563) for each communication channel, and the DSS 520 includes a reference communication state object (similar to 551) for each communication channel. In some implementations, each communication channel is a chat channel. In some implementations, each reference communication state object for the DSS account of the application server system 531 is managed by a single data synchronization instance for the DSS account of the application server system 531. In some implementations, a plurality of data synchronization instances for the DSS account of the application server system 531 manage the plurality of reference communication state objects for the DSS account of the application server system 531.

FIG. 5B

In some implementations, the application platform system 502 of FIG. 5B provides a service of the application server system 532 to client systems 513 and 514. In some implementations, the service of the application server system 532 is a cloud service, and the DSS 520 provides request/response communication between the client system 513 and the application server system 532, and between the client system 514 and the application server system 532.

The application platform system 502 includes the client systems 513 and 514, the DSS 520, and the application server system 532.

The client system 513 includes a local client API state object 564. The client system 514 includes a local client API state object 565.

The DSS 520 includes a data synchronization instance 542 for an account of the DSS ("Account B"). The data synchronization instance 542 includes a reference API state object 552 and a reference API state object 553.

The application server system 532 includes a local server API state object 566, and a local server API state object 591.

In some implementations, the local client API state object 564 and the local server API state object 566 are synchronized with the reference API state object 552. In some implementations, the local client API state object 565 and the local server API state object 591 are synchronized with the reference API state object 553.

In some implementations, the local client API state object 564, the local server API state object 566, and the reference API state object 552 provide communication between the client system 513 and the application server system 532. In some implementations, the local client API state object 564, the local server API state object 566, and the reference API state object 552 provide communication of API requests and API responses of an API of the application server system 532 between the client system 513 and the application server system 532.

In some implementations, the local client API state object 565, the local server API state object 591, and the reference API state object 553 provide communication between the client system 514 and the application server system 532. In some implementations, the local client API state object 565, the local server API state object 591, and the reference API state object 553 provide communication of API requests and API responses of an API of the application server system 532 between the client system 514 and the application server system 532.

In some implementations, the state objects 552, 564 and 566 include API request data and API response data communicated between the client system 513 and the application server system 532. In some implementations, the state objects 553, 565 and 591 include API request data and API response data communicated between the client system 514 and the application server system 532.

In some implementations, the client systems 513 and 514, the data synchronization instance 542, and the application server system 532 are associated with a second DSS account (e.g., "Account B") of a plurality of accounts managed by an account system (not shown) of the DSS 520. In some implementations, the client systems 513 and 514, and the application server system 532 are systems of an account holder of a second DSS account (e.g., "Account B") of a plurality of accounts managed by an account system (not shown) of the DSS 520. In some implementations, the client systems 513 and 514, and the application server system 532 are external to the DSS 520.

In some implementations, the client systems 513 and 514 are similar to the client systems 131 and 132 of FIG. 1. In some implementations, the client systems 513 and 514 are similar to the client system 331 of FIG. 3. In some implementations, the state objects 564, 565, 566 and 591 are similar to the state objects 141 and 142 of FIG. 1. In some implementations, the state objects 564, 565, 566 and 591 are similar to the state object 341 FIG. 3. In some implementations, the state objects 552 and 553 are similar to the state object 111 of FIG. 1. In some implementations, the data synchronization instance 542 is similar to the data synchronization instance 541. In some implementations, the application server system 532 is similar to the application server system 531.

In some implementations, the DSS 520 manages reference API state objects for a plurality of DSS accounts. In some implementations, the DSS 520 manages reference API state objects for a plurality of DSS accounts, and each DSS account is associated with at least one application server system that communicates API requests and responses of an API of the application server system with at least one client system by synchronizing local API state objects with the reference API state object managed by the DSS.

In some implementations, a plurality of client systems (e.g., the client system 513 and another client system, not shown) are constructed to synchronize their respective local client API state objects (e.g., 564) with the same reference API state object (e.g., 552). In some implementations, a first device (e.g., a mobile phone) used by a first user communicates with the application server system 532 via the DSS 520, and the DSS 520 stores the application state of the communication in the reference API state object 552 of the DSS; when the first user transitions to a second device (e.g., a laptop), the second device used by the first user accesses the reference API state object 552 of the DSS to obtain the user's application state. In this manner, application state can be maintained across a plurality of devices used by a user.

FIG. 5C

In some implementations, the application platform system 503 of FIG. 5C provides communication between the client system 515 and the client system 516. In some implementations, the application platform system 503 of FIG. 5C provides peer-to-peer communication between the client system 515 and the client system 516. In some implementations, the application platform system 503 of FIG. 5C provides ad-hoc communication between the client system 515 and the client system 516. In some implementations, the application platform system 503 of FIG. 5C provides communication between the client system 515 and the client system 516, and the client system 515 and the client system 516 are both IoT devices. In some implementations, the application platform system 503 of FIG. 5C provides communication between the client system 515 and the client system 516, and the client system 515 and the client system 516 are both IoT devices each including an IoT management layer module.

The application platform system 503 includes the client systems 515 and 516, and the DSS 520.

The client system 515 includes a local communication state object 567. In some implementations, the local communication state object 567 is a chat channel state object. The client system 516 includes a local communication state object 568. In some implementations, the local communication state object 568 is a chat channel state object.

The DSS 520 includes a data synchronization instance 543 for an account of the DSS ("Account C"). The data synchronization instance 543 includes a reference communication state object 554. In some implementations, the reference communication state object 554 is a chat channel state object.

In some implementations, the local communication state objects 567 and 568 are synchronized with the reference communication state object 554.

In some implementations, the local communication state objects 567 and 568, and the reference communication state object 554 provide communication between the client system 515 and the client system 516. In some implementations, the local communication state objects 567 and 568, and the reference communication state object 554 provide chat channel communication between the client system 515 and the client system 516.

In some implementations, the client systems 515 and 516, and the data synchronization instance 543 are associated with a third DSS account (e.g., "Account C") of a plurality of accounts managed by an account system (not shown) of the DSS 520. In some implementations, the client systems 515 and 516 are systems of an account holder of a third DSS account (e.g., "Account C") of a plurality of accounts managed by an account system (not shown) of the DSS 520. In some implementations, the client systems 515 and 516 are external to the DSS 520.

In some implementations, the client systems 515 and 516 are similar to the client systems 131 and 132 of FIG. 1. In some implementations, the client systems 515 and 516 are similar to the client system 331 of FIG. 3. In some implementations, the state objects 567 and 568 are similar to the state objects 141 and 142 of FIG. 1. In some implementations, the state objects 567 and 568 are similar to the state object 341 FIG. 3. In some implementations, the state object 554 is similar to the state object 111 of FIG. 1. In some implementations, the DSS 520 is similar to the cloud data synchronization system 101 of FIG. 1. In some implementations, the DSS 520 is similar to the cloud data synchronization system 310 of FIG. 3. In some implementations, the data synchronization instance 543 is similar to the data synchronization instance 110 of FIG. 1. In some implementations, the DSS 520 includes a resolution system similar to the resolution system 112 of FIG. 1.

In some implementations, the DSS 520 manages reference communication state objects for a plurality of DSS accounts.

4. Application Platform Methods

FIG. 6

Figure 6:
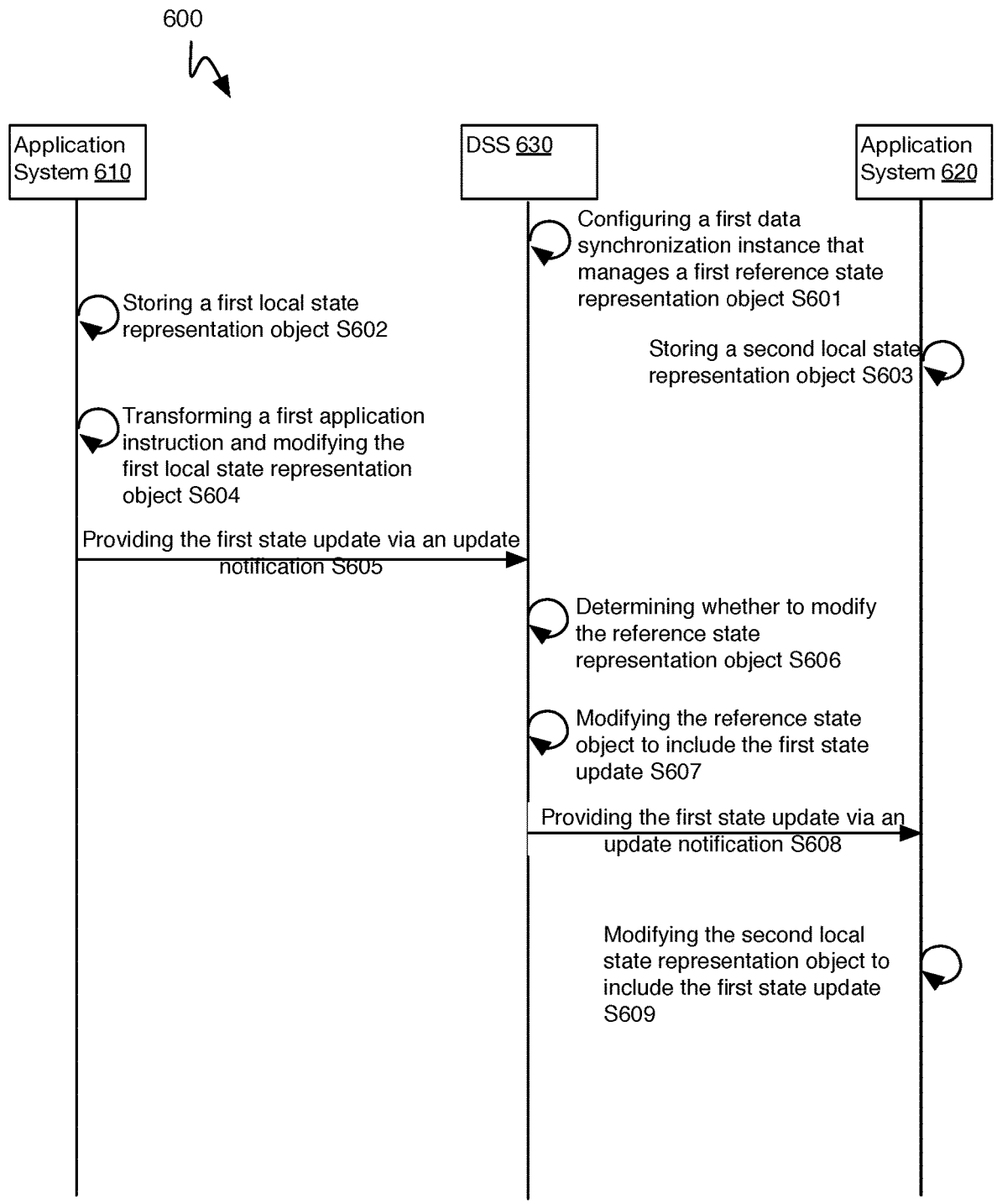
FIG. 6 is a sequence diagram representation of a method, in accordance with embodiments.

The method 600 of FIG. 6 is performed at an application platform system (e.g., 501-503 of FIGS. 5A-5C). In some implementations, the application platform system includes a first application system 610 (e.g., one of 511-516 and 531-532 of FIGS. 5A-C), a second application system 620 (e.g., a different one of 511-516 and 531-532 of FIGS. 5A-C), and a multi-tenant data synchronization system (DSS) 630 (e.g., 520 of FIG. 5). In some implementations, the first application system 610 is similar to at least one of 131 and 132 of FIG. 1, 331 of FIGS. 3, and 511-516 and 531-532 of FIGS. 5A-C, and the second application system 620 is similar to at least one of 131 and 132 of FIG. 1, 331 of FIGS. 3, and 511-516 and 531-532 of FIGS. 5A-C. In some implementations, the DSS 630 is similar to at least one of the cloud data synchronization system 101 of FIG. 1, the cloud data synchronization system 310 of FIG. 2, and the DSS 520 of FIGS. 5A-C.

In some embodiments, the method 600 includes: the DSS 630 configuring a first data synchronization instance (e.g., 541, 542, 543) for a first account of the DSS (e.g., "Account A", "Account B", "Account C"), responsive to a request provided by a system of the first account, wherein the first data synchronization instance manages a first reference state representation object (e.g., 521, 522, 551-554) for the first account at the DSS (process S601); the first application system 610 storing a first local state representation object (e.g., 523-526, 561-568, 591) that corresponds to the first reference state representation object of the DSS, wherein the first application system is constructed to receive first reference state representation object update notifications provided by the DSS (process S602); the second application system 620 storing a second local state representation object (e.g., 523-526, 561-568, 591) that corresponds to the first reference state representation object of the DSS, wherein the second application system is constructed to receive first reference state representation object update notifications provided by the DSS (process S603); the first application system 610 transforming a first application instruction of the first application system into a first state update, and modifying the first local state representation object to include the first state update (process S604); the first application system 610 providing at least the first state update of the modified first local state representation object to the DSS via a first local state representation object update notification (process S605); responsive to the first state update, the DSS 630 determining whether to modify the first reference state representation object of the DSS to include the first state update (process S606); responsive to a determination by the DSS to modify the first reference state representation object to include the first state update, the DSS 630 modifying the first reference state representation object to include the first state update (process S607); the DSS 630 providing at least the first state update to the second application system via a first reference state representation object update notification (process S608); and responsive to the first state update, the second application system 620 modifying the second local state representation object to include the first state update (process S609). The first application system 610 and the second application system 620 communicate by using the DSS.

In some embodiments, the method 600 includes: the second application system transforming a second application instruction of the second application system into a second state update, and modifying the second local state representation object to include the second state update; and the second application system providing at least the second state update of the modified second local state representation object to the DSS. The DSS determining whether to modify the first state representation object of the DSS to include the first state update includes: the DSS determining whether the first state update conflicts with the second state update; and responsive to a determination that the first state update conflicts with the second state update, the DSS resolving the conflict between the first state update and the second state update.

In some embodiments, the first application system is a client system (e.g., 511-516) that includes a first client application (e.g., 161, 162 of FIG. 1, 361 of FIG. 3), and the second application system is a client system (e.g., a different one of 511-516) that includes a second client application. In some embodiments, first client application and the second client application are chat client applications of a chat service provided by the system (e.g., 531) of the first account (e.g., "Account A"), the first application instruction is a chat client application instruction, and the chat service (e.g., a chat service of the server system 531) is constructed to receive first reference state representation object update notifications. In some embodiments, the chat client application instruction includes at least one of: an instruction to add a message to a chat channel, and an instruction to add a participant to a chat channel.

In some embodiments, the first application system is an application server system (e.g., 531-532) that includes a first application server, the first application server system is the system that provides the request to configure the first data synchronization instance (e.g., 541, 542) for the first account, the second application system is a client system (e.g., 511-514) that includes a first client application, and the first client application and the first application server communicate via the DSS 520.

In some embodiments, the first application system is a client system (e.g., 511-514) that includes a first client application, the second application system is an application server system (e.g., 531-532) that includes a first application server, at least one of the application server system and the client system is the system that provides the request to configure the first data synchronization instance (e.g., 541, 542) for the first account, and the first client application and the first application server communicate via the DSS 520. In some embodiments, the method 600 includes: the application server system (e.g., 531-532) determining whether the first state update corresponds to a command of the first application server; and responsive to a determination by application server system (e.g., 531-532) that the first state update corresponds to a command of the first application server, the application server system (e.g., 531-532) executing the command and providing a response to the client system via the DSS 520.

In some embodiments, the system of the first account provides the request to configure the first data synchronization instance via at least one of an administrator user interface and a programmatic interface. In some embodiments, the system of the first account is at least one of the first application system and the second application system.

In some embodiments, the DSS 520 configuring the first data synchronization instance (the process S601) includes: the DSS 520 configuring at least one option of the first data synchronization instance (e.g., 541-543), and the at least one option includes at least one of: a geographic data storage option, a data encryption setting, and a permission of the data synchronization instance.

In some embodiments, the first application system stores the first local state representation object (e.g., 523-526, 561-568 and 591) responsive to at least one of: a communication provided by the second application system, a communication provided by the DSS 520, a communication provided by the system of the first account, and an application instruction of a first application of the first application system.

In some embodiments, the first application system storing the first local state representation object (e.g., 523-526, 561-568 and 591) includes: storing the first local state representation object in association with an identifier of the first data synchronization instance (e.g., 541-543), and the second application system storing the second local state representation object includes: storing the second local state representation object in association with the identifier of the first data synchronization instance (e.g., 54-543). In some implementations, the first application system receives the identifier of the first data synchronization instance from at least one of: the second application system, the DSS 520, the system of the first account, and an application instruction of a first application of the first application system. In some implementations, the second application system receives the identifier of the first data synchronization instance from at least one of: the first application system, the DSS 520, the system of the first account, and an application instruction of a second application of the second application system.

In some embodiments, the first application system storing the first local state representation object includes: storing the first local state representation object (e.g., 523-526, 561-568 and 591) in association with an identifier of the first state representation object (e.g., one of 521, 522, 551-554) of the DSS 520, and the second application system storing the second local state representation object includes: storing the second local state representation object in association with the identifier of the first state representation object (e.g., one of 521, 522, 551-554) of the DSS 520.

In some implementations, the first application system receives the identifier of the first state representation object from at least one of: the second application system, the DSS 520, the system of the first account, and an application instruction of a first application of the first application system. In some implementations, the second application system receives the identifier of the first state representation object from at least one of: the first application system, the DSS 520, the system of the first account, and an application instruction of a second application of the second application system.

In some embodiments, the first application system is constructed to receive first reference state representation object update notifications provided by the DSS 520 via a push notification module (e.g., 351 of FIG. 3) of the first application system, and the second application system is constructed to receive first reference state representation object update notifications provided by the DS S 520 via a push notification module (e.g., 351 of FIG. 3) of the second application system. In some embodiments, the first application system is constructed to subscribe to first reference state representation object update notifications provided by the DSS 520 via the push notification module of the first application system, and the second application system is constructed to subscribe to first reference state representation object update notifications provided by the DSS 520 via the push notification module of the second application system.

In some implementations, the first application system is constructed to receive first reference state representation object update notifications provided by the DSS 520 via a polling module of the first application system that periodically requests first reference state representation object update notifications from the DSS, and the second application system is constructed to receive first reference state representation object update notifications provided by the DSS via a polling module of the second application system that periodically requests first reference state representation object update notifications from the DSS.

In some implementations, the DSS is external to each of the first application system and the second application system.

FIG. 7

Figure 7A:
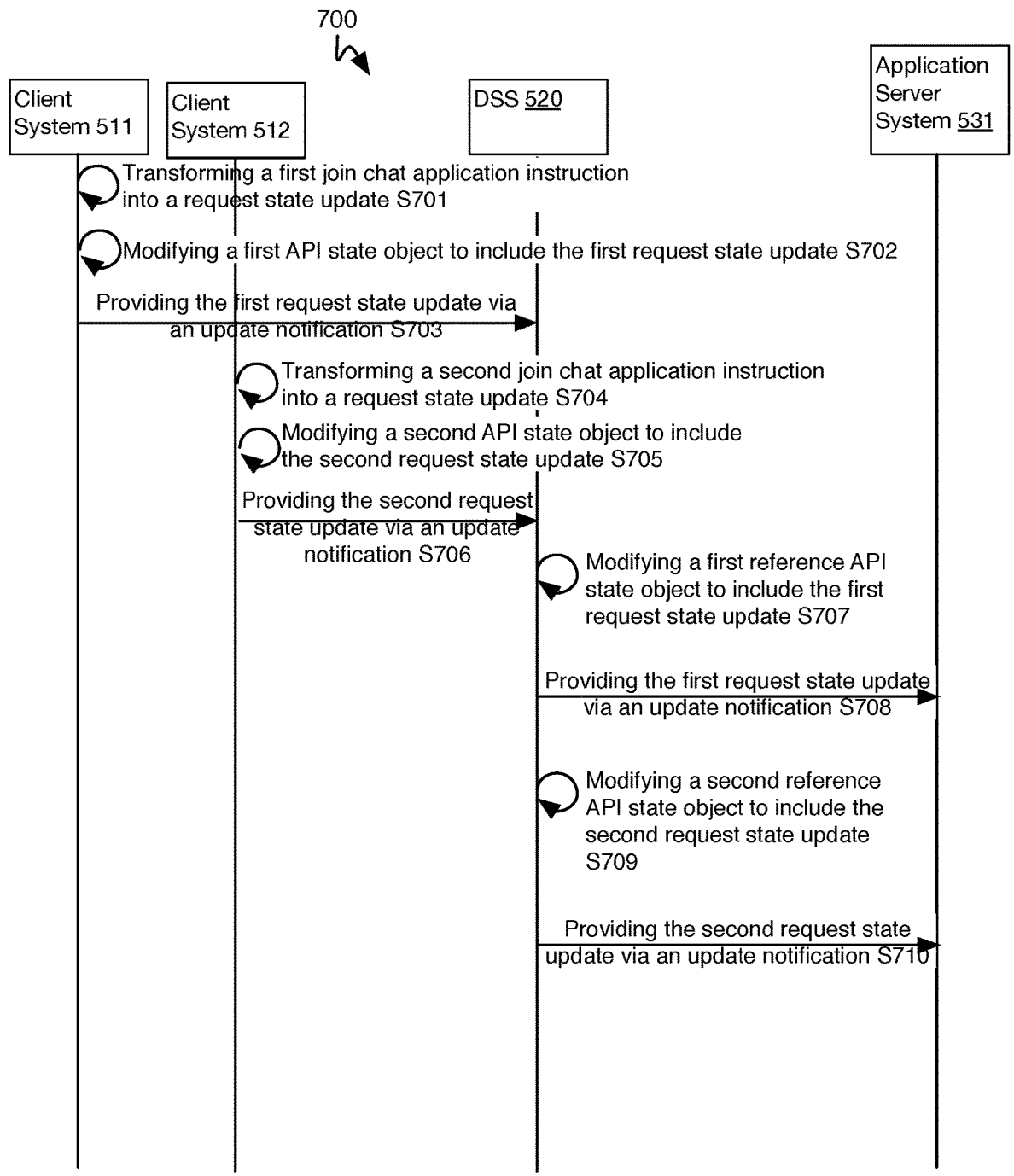
FIGS. 7A-7B are a sequence diagram representations of a method, in accordance with embodiments.
Figure 7B:
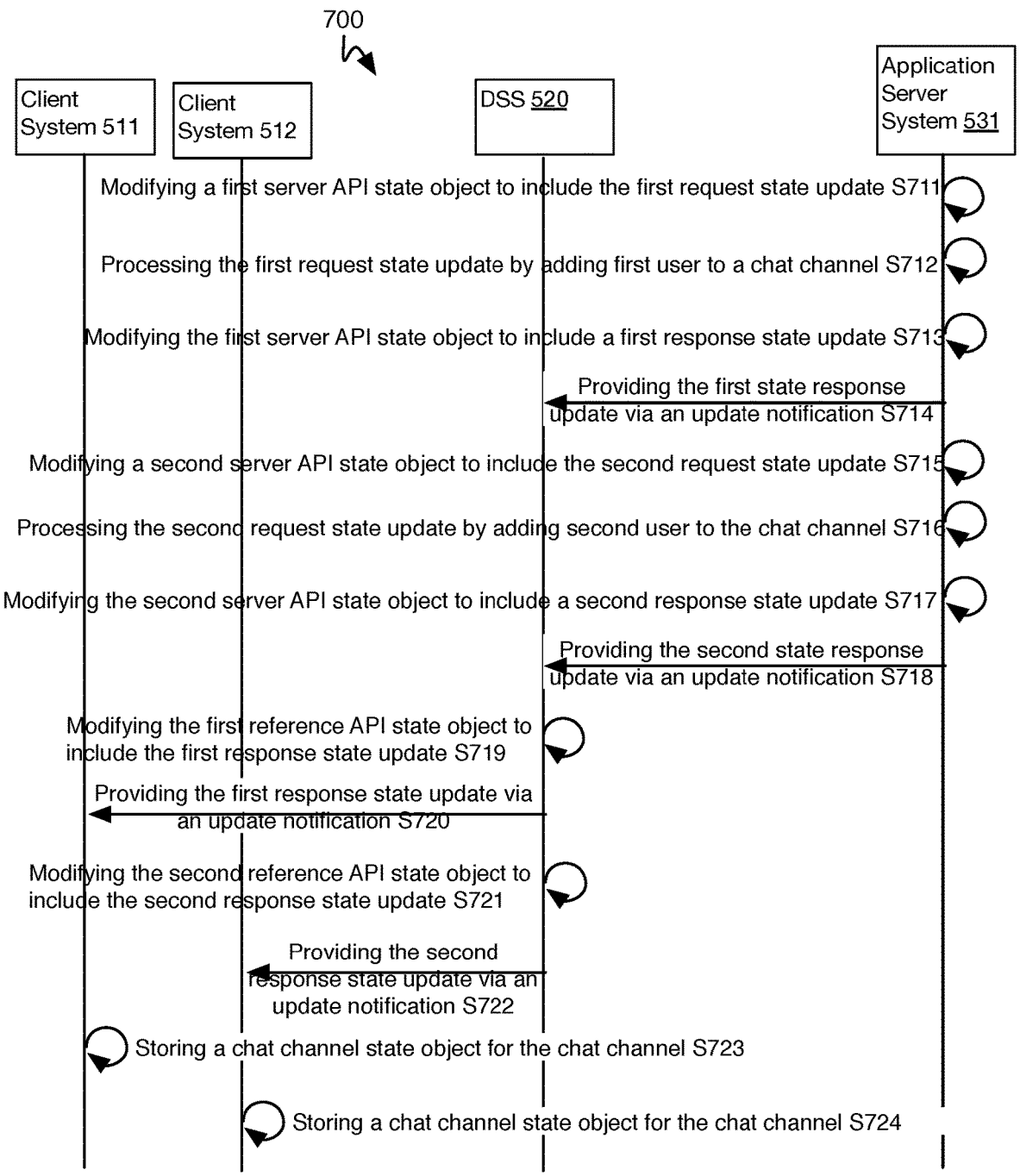

The method 700 of FIGS. 7A-B is performed at a chat system. In some implementations, the application platform system 501 of FIG. 5A is a chat system, and the method 700 is performed by the application platform system 501. In some implementations, the application platform system 501 includes a first chat client system (e.g., 511 of FIG. 5A), a second chat client system system (e.g., 512 of FIG. 5A), a multi-tenant data synchronization system (DSS) (e.g., 520 of FIG. 5A), and a chat application server system (e.g., the application server system 531 of FIG. 5A).

In some embodiments, the method 700 includes: the first chat client system 511 transforming a first chat client application instruction to join a first chat channel into a first request state update (process S701); the system 511 modifying a first local application programming interface (API) state object 523 stored at the first chat client system 511 to include the first request state update (process S702); the system 511 providing the first request state update to the DSS 520 via a first local API state update notification (process S703); the second chat client system 512 transforming a second chat client application instruction to join the first chat channel into a second request state update (process S704); the system 512 modifying a second local API state object 524 stored at the second chat client system 512 to include the second request state update (process S705); the system 512 providing the second request state update to the DSS via a second local API state update notification (process S706); the DSS 520 modifying a first reference API state object 521 stored at the DSS 520 to include the first request state update (process S707); the DSS 520 providing the first request state update to the chat application server system 531 via a first reference API state update notification (process S708); the DSS 520 modifying a second reference API state object 522 stored at the DSS 520 to include the second request state update (process S709); the DSS 520 providing the second request state update to the chat application server system 531 via a second reference API state update notification (process S710); the chat application server system 531 modifying a first local API state object 525 stored at the chat application server system 531 to include the first request state update (process S711); the system 531 processing the first request state update by updating first chat channel state of the first chat channel to include a user of the first chat client application (of the system 511) as a participant of the first chat channel (process S712); the system 531 modifying the first local API state object 525 stored at the chat application server system 531 to include a first response state update that includes an identifier for a first reference chat channel state object 551, wherein the first reference chat channel state object 551 includes the first chat channel state (process S713); the system 531 providing the first response state update to the DSS 520 via a third local API state update notification (process S714); the system 531 modifying a second local API state object 526 stored at the chat application server system 531 to include the second request state update (process S715); the system 531 processing the second request state update by updating first chat channel state of the first chat channel to include a user of the second chat client application (of the system 512) as a participant of the first chat channel (process S716); the system 531 modifying the second local API state object 526 stored at the chat application server system 531 to include a second response state update that includes the identifier for the first reference chat channel state object 551 (process S717); the system 531 providing the second response state update to the DSS 520 via a fourth local API state update notification (process S718); the DSS 520 modifying the first reference API state object 521 stored at the DSS 520 to include the first response state update (process S719); the DSS 520 providing the first response state update to the first chat client system 511 via a third reference API state update notification (process S720); the DSS 520 modifying the second reference API state object 522 stored at the DSS 520 to include the second response state update (process S721); the DSS 520 providing the second response state update to the second chat client system 512 via a fourth reference API state update notification (process S722); the first chat client system 511 storing a first local chat channel state object 561 in association with the identifier for the first reference chat channel state object 551 (process S723); and the second chat client system 512 storing a second local chat channel state object 562 in association with the identifier for the first reference chat channel state object 551 (process S724). The first chat client system 511 sends a message via the first chat channel by modifying the first local chat channel state object 561 which is synchronized with the second local chat channel state object 562 via the first reference chat channel state object 551. The second chat client system 512 sends a message via the first chat channel by modifying the second local chat channel state object 562 which is synchronized with the first local chat channel state object 561 via the first reference chat channel state object 551.

In some embodiments, the first chat client system 511, the second chat client system 512, the chat application server system 531, the first reference chat channel state object 551, the first local chat channel state object 561, the second local chat channel state object 562, the first reference API state object 521, the second reference API state object 522, the first local API state object 523, the second local API state object 524, the first local API state object 525, and the a second local API state object 526 are associated with a first DSS account (e.g., "Account A") managed by an account system of the DSS 520.

In some implementations, the DSS 520 is constructed to resolve conflicting updates to the first reference chat channel state object 551 received from the first chat client system 511 and the second chat client system 512. In some implementations, the DSS is constructed to resolve conflicting updates to the first reference chat channel state object 551 received from the first chat client system 511 and the second chat client system 512 by using a resolution system similar to the resolution system 112 of FIG. 1.

FIG. 8

Figure 8:
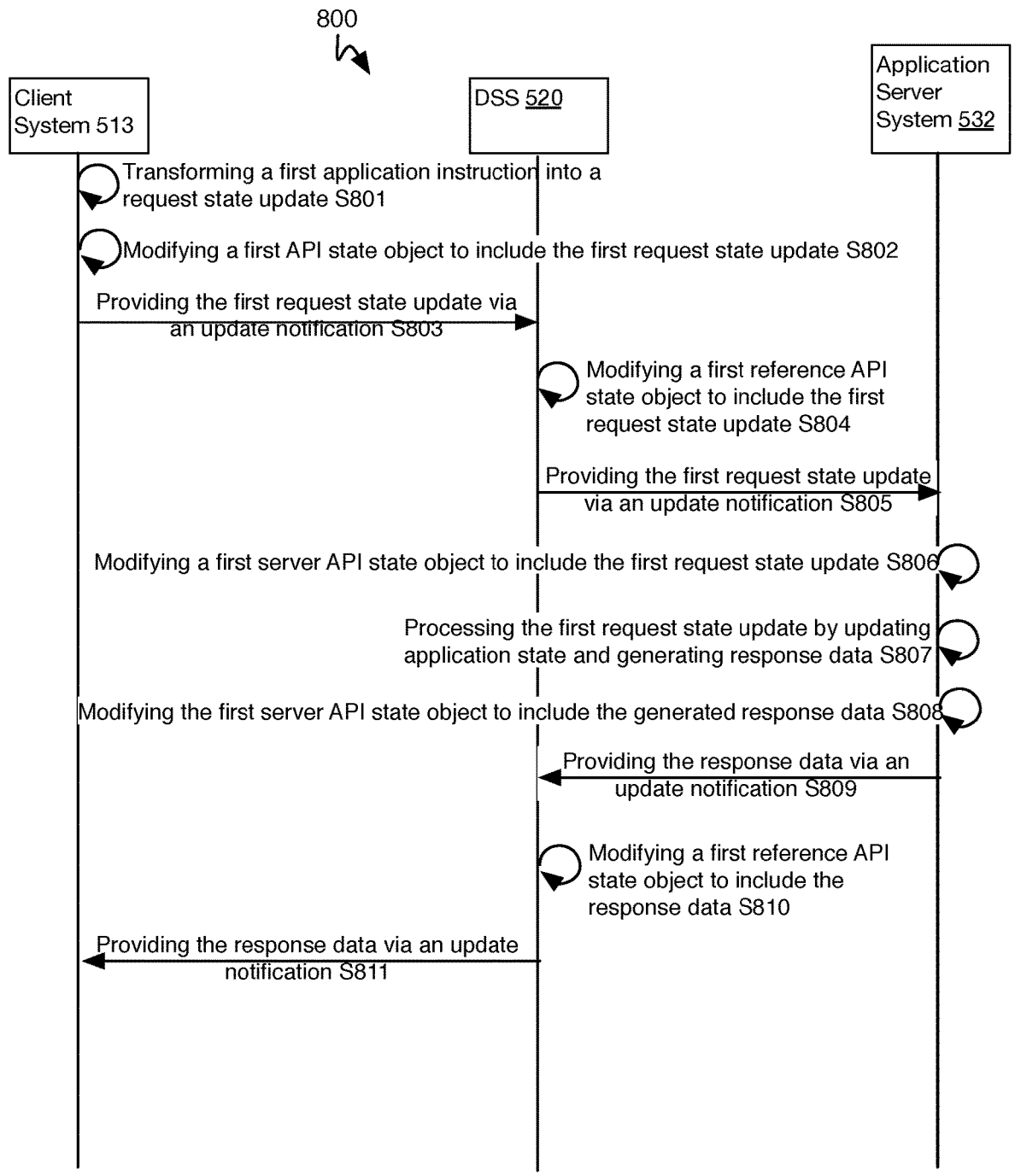
FIG. 8 is a sequence diagram representation of a method, in accordance with embodiments.

The method 800 of FIG. 8 is performed at an application platform system (e.g., 501-502 of FIGS. 5A-5B). In some implementations, the application platform system includes a first client system (e.g., 513 of FIG. 5B), a multi-tenant data synchronization system (DSS) (e.g., 520 of FIG. 5B), and a first application server system (e.g., 532 of FIG. 5B).

In some embodiments, the method 800 includes: the first client system 513 transforming a first application instruction of a first client application (e.g., an application similar to at least one of 161 and 162 of FIGS. 1, and 361 of FIG. 3) of the first client system 513 into a first request state update (process S801); the system 513 modifying a first local client application programming interface (API) state object 564 stored at the first client system to include the first request state update (process S802); the system 513 providing the first request state update to the DSS 520 via a first local client API state update notification (process S803); the DSS 520 modifying a first reference API state object 552 stored at the DSS 520 to include the first request state update (process S804); the DSS 520 providing the first request state update to a first application server system 532 of the application platform system via a first reference API state update notification (process S805); the first application server system 532 modifying a first local server API state object 566 stored at the first application server system 532 to include the first request state update (process S806); the first application server system 532 processing the first request state update by updating first application state at the first application server system 532 for the first client application and generating first response data (process S807); the first application server system 532 modifying the first local server API state object 566 to include the generated first response data (process S808); the first application server system 532 providing the first response data to the DSS 520 via a first local server API state update notification (process S809); the DSS 520 modifying the first reference API state object 552 stored at the DSS 520 to include the first response data (process S810); and the DSS 520 providing the first response data to the first client system 513 via a second reference API state update notification (process S811).

In some embodiments, the first local client API state object 564 and the first local server API state object 566 are synchronized with the first reference API state object 552, and the first client system 513 and the first application server system 532 communicate by using the DSS 520. In some embodiments, the first local client API state object 564, the first reference API state object 552, and the first local server API state object 566 are associated with a first DSS account (e.g., "Account B") of a plurality of accounts managed by an account system (not shown) of the DSS 520. In some embodiments, the first client system 513 and the first application server system 532 are systems of an account holder of the first DSS account (e.g., "Account B").

In some implementations, the DSS 520 is external to each of the first client system 513 and the first application server system 532. In some implementations, the first client system 513 transforms the first state response update into an application callback of the first client application of the first client system 513.

5. System Architecture

Data Synchronization System

Figure 9:
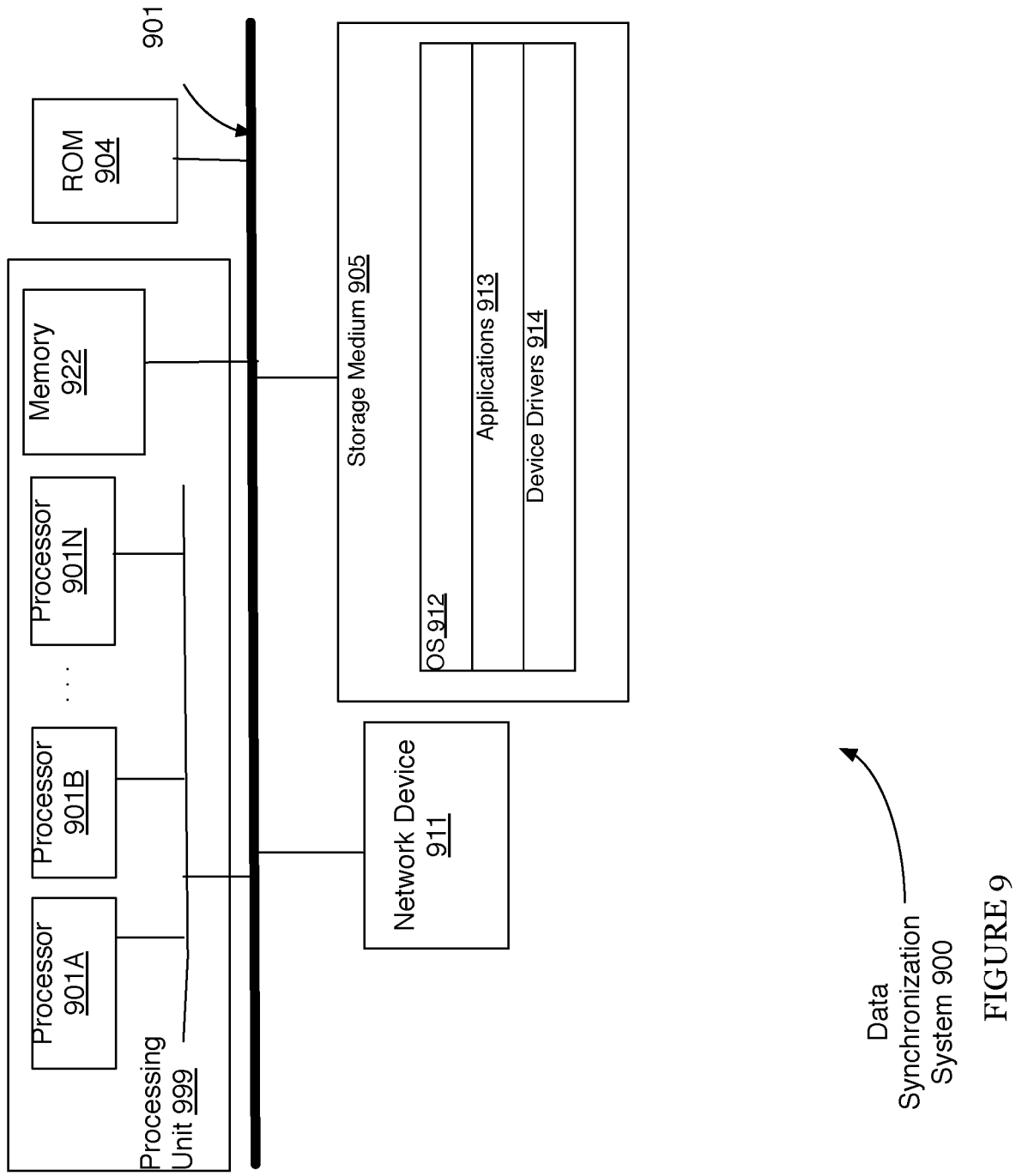
FIG. 9 is an architecture diagram of a data synchronization system, in accordance with embodiments.

FIG. 9 is an architecture diagram of a data synchronization system (e.g., 101 of FIG. 1, 310 of FIGS. 3, and 520 of FIGS. 5A-C) according to an implementation in which the system is implemented by a server device. In some implementations, the system is implemented by a plurality of devices. In some implementations, the system 900 is similar to the system 101 of FIG. 1. In some implementations, the system 900 is similar to the system 310 of FIG. 3. In some implementations, the system 900 is similar to the system 520 of FIGS. 5A-C.

The bus 901 interfaces with the processors 901A-901N, the main memory (e.g., a random access memory (RAM)) 922, a read only memory (ROM) 904, a processor-readable storage medium 905, and a network device 911. In some implementations, the system 900 includes at least one of a display device and a user input device.

The processors 901A-901N may take many forms, such as ARM processors, X86 processors, and the like.

In some implementations, the system (e.g., 520) includes at least one of a central processing unit (processor) and a multi-processor unit (MPU).

The processors 901A-901N and the main memory 922 form a processing unit 999. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more data synchronization instances.

The network adapter device 911 provides one or more wired or wireless interfaces for exchanging data and commands between the system (e.g., 520) and other devices, such as an external system (e.g., 511-516, 531, 532). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 922 (of the processing unit 999) from the processor-readable storage medium 905, the ROM 904 or any other storage location. During execution of these software programs, the respective machine-executable instructions are accessed by at least one of processors 901A-901N (of the processing unit 999) via the bus 901, and then executed by at least one of processors 901A-901N. Data used by the software programs are also stored in the memory 922, and such data is accessed by at least one of processors 901A-901N during execution of the machine-executable instructions of the software programs. The processor-readable storage medium 905 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 905 includes machine-executable instructions (and related data) for an operating system 912, software programs 913, and device drivers 914. The processor-readable storage medium 905 includes machine-executable instructions (and related data) for at least one data synchronization instance (e.g., 541-543). In some implementations, the processor-readable storage medium 905 includes instructions (and related data) for at least one of a notification module (e.g., 312 of FIG. 3) and a resolution system (e.g., 112 of FIG. 1).

Application System

Figure 10:
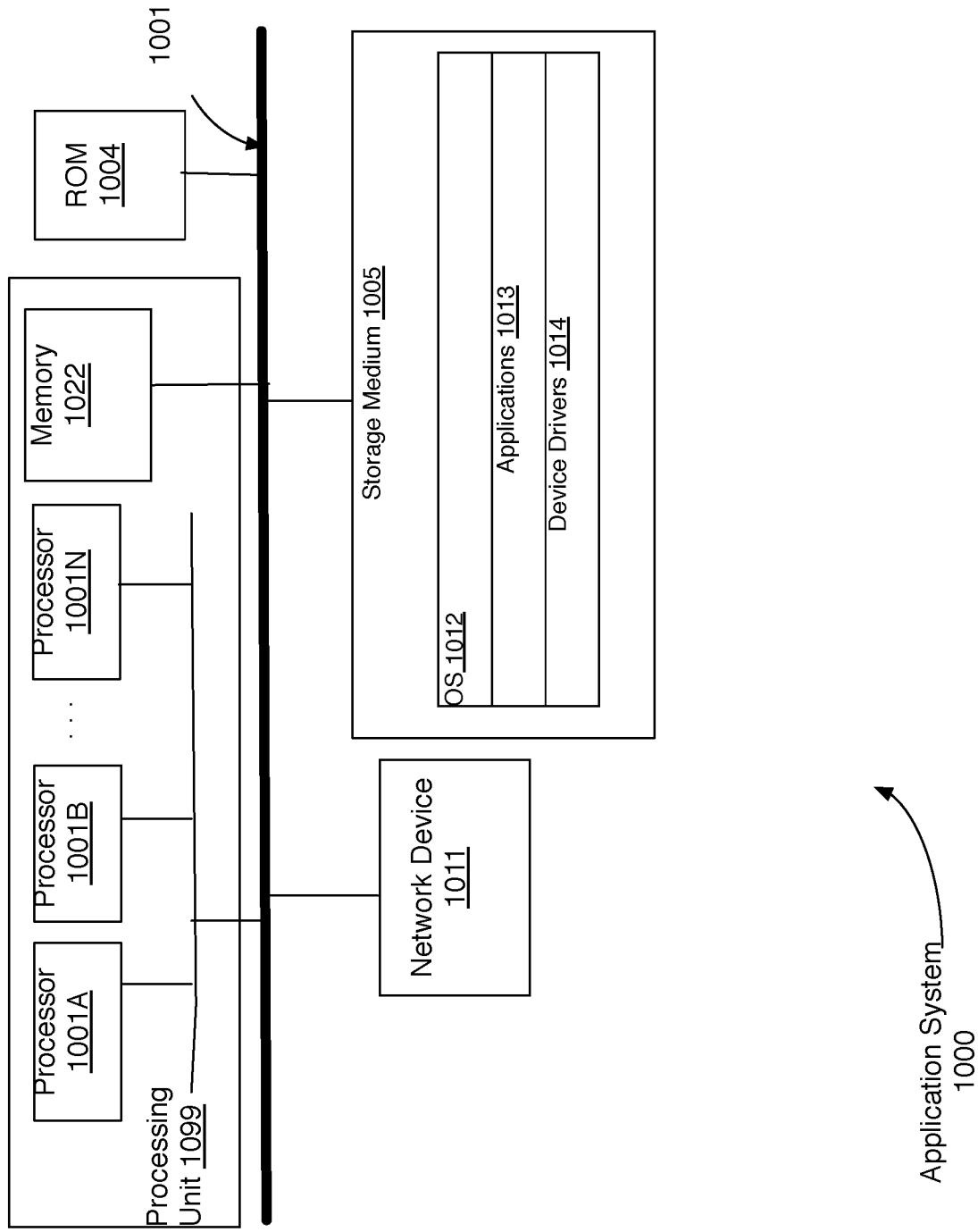
FIG. 10 is an architecture diagram of an application system, in accordance with embodiments.

FIG. 10 is an architecture diagram of an application system 1000 (e.g., one of 131, 132 of FIG. 1, 331 of FIG. 3, 511-516 of FIGS. 5A-C, and one of 531-532 of FIGS. 5A-B) according to an implementation in which the application system is implemented by a computing device. In some implementations, the application system is implemented by a plurality of devices.

The bus 1001 interfaces with the processors 1001A-1001N, the main memory (e.g., a random access memory (RAM)) 1022, a read only memory (ROM) 1004, a processor-readable storage medium 1005, and a network device 1011. In some implementations, the external system includes a display device and a user input device.

The processors 1001A-1001N may take many forms, such as ARM processors, X86 processors, and the like.

In some implementations, the computing device 1000 includes at least one of a central processing unit (processor) and a multi-processor unit (MPU).

The processors 1001A-1001N and the main memory 1022 form a processing unit 1099. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 1011 provides one or more wired or wireless interfaces for exchanging data and commands between the application system and other devices, such as the system DSS 520 of FIGS. 5A-B. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1022 (of the processing unit 1099) from the processor-readable storage medium 1005, the ROM 1004 or any other storage location. During execution of these software programs, the respective machine-executable instructions are accessed by at least one of processors 1001A-1001N (of the processing unit 1099) via the bus 1001, and then executed by at least one of processors 1001A-1001N. Data used by the software programs are also stored in the memory 1022, and such data is accessed by at least one of processors 1001A-1001N during execution of the machine-executable instructions of the software programs. The processor-readable storage medium 1005 is one of, or a combination of two or more of, a hard drive, a flash drive, a DVD, a CD, an optical disk, a floppy disk, a flash storage, a solid-state drive, a ROM, an EEPROM, an electronic circuit, a semiconductor memory device, and the like. The processor-readable storage medium 1005 includes machine-executable instructions (and related data) for an operating system 1012, software programs 1013, and device drivers 1014. In some implementations in which the application system 1000 is a client system, the processor-readable storage medium 1005 includes machine-executable instructions (and related data) for at least one of a client application, a client data synchronization module, an application layer module, an IP messaging module, an IoT device management module, a notification module, and a connectivity layer module. In some implementations in which the application system 1000 is a client system, the processor-readable storage medium 1005 includes at least one local state object.

In some implementations in which the application system 1000 is an application server system, the processor-readable storage medium 1005 includes machine-executable instructions (and related data) for at least one of a server application, a data synchronization module, a server application layer module, a notification module, and a connectivity layer module. In some implementations in which the application system 1000 is an application server system, the processor-readable storage medium 1005 includes at least one local state object.

6. Machines

The system and method of the preferred embodiment and variations thereof can be embodied and/or implemented at least in part as a machine configured to receive a computer-readable medium storing computer-readable instructions. The instructions are preferably executed by computer-executable components preferably integrated with the media intelligence platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

7. Conclusion

As a person skilled in the art will recognize from the previous detailed description and from the figures and claims, modifications and changes can be made to the preferred embodiments of the invention without departing from the scope of this invention defined in the following claims.

What is claimed is:

1. A computer-implemented method comprising:
generating, by a data synchronization system (DSS), a reference Application Programming Interface (API) state object corresponding to an account and having a reference value for synchronizing a local value of a local API state object stored at each device among a plurality of devices that all correspond to the account;
receiving, by the DSS, a first update message from a first device that corresponds to the account among the plurality of devices that all correspond to the account, the first update message including an update of the local value of the local API state object, the first device sending the first update message in response to an application executing in the first device updating the local value of the local API state object stored at the first device that corresponds to the account;
updating, by the DSS and based on the updated local value received in the first update message, the reference value of the reference API state object that corresponds to the account; and
transmitting, by the DSS, a second update message to one or more subscribed devices that all correspond to the account among the plurality of devices that all correspond to the account, the one or more subscribed devices being subscribed to receive updates of the reference value of the reference API state object that corresponds to the account, the transmitted second update message providing the one or more subscribed devices with the updated reference value of the reference API state object that corresponds to the account.

2. The method as recited in claim 1, wherein each subscribed device receiving the second update message is configured to update the local value of the local API state object stored at the subscribed device.

3. The method as recited in claim 1, wherein the first device includes a client data synchronization module configured to interact with the local API state object stored at the first device and to send the first update message with the update of the local value of the local API state object.

4. The method as recited in claim 1, wherein the DSS provides configurable options comprising at least one of control over data handling, access permissions, validation rules, how data is stored geographically, or how long data is persisted.

5. The method as recited in claim 1, wherein the DSS comprises a data resolution system configured to resolve inconsistencies for multiple updates to the local value of the local API state object.

6. The method as recited in claim 5, further comprising:
receiving a plurality of third update messages for the local value of the local API state object; and
determining a resolution that incorporates the plurality of third update messages into a single representation of the local API state object.

7. The method as recited in claim 1, further comprising:
providing, by the DSS, request/response communication services between an application server system (ASS) and the plurality of devices.

8. The method as recited in claim 7, wherein the ASS provides peer-to-peer communications among the plurality of devices.

9. The method as recited in claim 7, wherein the plurality of devices are internet of things (IOT) devices.

10. The method as recited in claim 1, wherein the reference API state object is maintained to facilitate chat services among the plurality of devices.

11. A system comprising:
a memory comprising instructions; and
one or more computer processors, wherein the instructions, when executed by the one or more computer processors, cause the system to perform operations comprising:
generating, by a data synchronization system (DSS), a reference Application Programming Interface (API) state object corresponding to an account and having a reference value for synchronizing a local value of a local API state object stored at each device among a plurality of devices that all correspond to the account;
receiving, by the DSS, a first update message that corresponds to the account among a first device from the plurality of devices that all correspond to the account, the first update message including an update of the local value of the local API state object, the first device sending the first update message in response to an application executing in the first device updating the local value of the local API state object stored at the first device that corresponds to the account;
updating, by the DSS and based on the updated local value received in the first update message, the reference value of the reference API state object that corresponds to the account; and
transmitting, by the DSS, a second update message to one or more subscribed devices that all correspond to the account among the plurality of devices that all correspond to the account, the one or more subscribed devices being subscribed to receive updates of the reference value of the reference API state object that corresponds to the account, the transmitted second update message providing the one or more subscribed devices with the updated reference value of the reference API state object that corresponds to the account.

12. The system as recited in claim 11, wherein each subscribed device receiving the second update message is configured to update the local value of the local API state object stored at the subscribed device.

13. The system as recited in claim 11, wherein the first device includes a client data synchronization module configured to interact with the local API state object stored at the first device and to send the first update message with the update of the local value of the local API state object.

14. The system as recited in claim 11, wherein the DSS provides configurable options comprising at least one of control over data handling, access permissions, validation rules, how data is stored geographically, or how long data is persisted.

15. The system as recited in claim 11, wherein the DSS comprises a data resolution system configured to resolve inconsistencies for multiple updates to the local value of the local API state object.

16. A non-transitory machine-readable storage medium including instructions that, when executed by a machine, cause the machine to perform operations comprising:
generating, by a data synchronization system (DSS), a reference Application Programming Interface (API) state object corresponding to an account and having a reference value for synchronizing a local value of a local API state object stored at each device among a plurality of devices that all correspond to the account;
receiving, by the DSS, a first update message that corresponds to the account among a first device from the plurality of devices that all correspond to the account, the first update message including an update of the local value of the local API state object, the first device sending the first update message in response to an application executing in the first device updating the local value of the local API state object stored at the first device that corresponds to the account;
updating, by the DSS and based on the updated local value received in the first update message, the reference value of the reference API state object that corresponds to the account; and
transmitting, by the DSS, a second update message to one or more subscribed devices that all correspond to the account among the plurality of devices that all correspond to the account, the one or more subscribed devices being subscribed to receive updates of the reference value of the reference API state object that corresponds to the account, the transmitted second update message providing the one or more subscribed devices with the updated reference value of the reference API state object that corresponds to the account.

17. The non-transitory machine-readable storage medium as recited in claim 16, wherein each subscribed device receiving the second update message is configured to update the local value of the local API state object stored at the subscribed device.

18. The non-transitory machine-readable storage medium as recited in claim 16, wherein the first device includes a client data synchronization module configured to interact with the local API state object stored at the first device and to send the first update message with the update of the local value of the local API state object.

19. The non-transitory machine-readable storage medium as recited in claim 16, wherein the DSS provides configurable options comprising at least one of control over data handling, access permissions, validation rules, how data is stored geographically, or how long data is persisted.

20. The non-transitory machine-readable storage medium as recited in claim 16, wherein the DSS comprises a data resolution system configured to resolve inconsistencies for multiple updates to the local value of the local API state object.

* * * * *

UNITED STATES PATENT AND TRADEMARK OFFICE
CERTIFICATE OF CORRECTION

PATENT NO. : 12,081,616 B2  
APPLICATION NO. : 17/649108  
DATED : September 3, 2024  
INVENTOR(S) : Olivier et al.

Page 1 of 1

It is certified that error appears in the above-identified patent and that said Letters Patent is hereby corrected as shown below:

In the Claims

In Column 26, Line 31, in Claim 9, delete "(IOT)" and insert --(IoT)-- therefor

Signed and Sealed this  
Second Day of September, 2025

Coke Morgan Stewart  
*Acting Director of the United States Patent and Trademark Office*